(12) United States Patent
Osborne et al.

(10) Patent No.: US 6,792,766 B2
(45) Date of Patent: Sep. 21, 2004

(54) ZONE DEMAND CONTROLLED DUAL AIR CONDITIONING SYSTEM AND CONTROLLER THEREFOR

(75) Inventors: David Osborne, Garland, TX (US); Brian Chester, Plano, TX (US); Gary R. Scoggins, Dallas, TX (US)

(73) Assignee: Cascade Manufacturing, L.P., Richardson, TX (US)

( * ) Notice: Subject to any disclaimer, the term of this patent is extended or adjusted under 35 U.S.C. 154(b) by 0 days.

(21) Appl. No.: 10/264,645

(22) Filed: Oct. 4, 2002

(65) Prior Publication Data

US 2004/0065095 A1 Apr. 8, 2004

(51) Int. Cl.[7] .......................... F25B 29/00; F25D 17/06
(52) U.S. Cl. ........................... 62/159; 62/201; 62/175; 236/1 B; 165/217
(58) Field of Search .................... 62/159, 162, 201, 62/238.6, 238.7, 175, 259.1, 177, 178, 179, 180; 165/217, 220; 236/1 B

(56) References Cited

U.S. PATENT DOCUMENTS

| | | | | |
|---|---|---|---|---|
| 3,628,600 A | * | 12/1971 | McFarlan | 62/325 |
| 4,559,788 A | * | 12/1985 | McFarlan | 62/159 |
| 4,683,942 A | * | 8/1987 | Bierkamp et al. | 62/259.1 |
| 4,843,832 A | * | 7/1989 | Yamada et al. | 62/159 |
| 4,959,970 A | * | 10/1990 | Meckler | 62/176.1 |
| 5,701,750 A | * | 12/1997 | Ray | 62/160 |
| 6,298,677 B1 | * | 10/2001 | Bujak, Jr. | 62/201 |
| 6,467,537 B1 | * | 10/2002 | Bujak, Jr. | 165/220 |

* cited by examiner

Primary Examiner—Harry B. Tanner
(74) Attorney, Agent, or Firm—Gary L. Bush; Andrews Kurth LLP

(57) ABSTRACT

A thermal zone demand controlled air conditioning fan coil unit using dual cascade arranged heat pumps, chilled water, or a combination of chilled water and hot water, with or without back up electric resistance heat strips, and having an air circulation system for circulating air to and from a plurality of thermal zones and including a conditioned air chamber having first and second heat exchange refrigerant coils or direct or reversed cycle water coils being connected in refrigerant circulating relation respectively with the heat pumps, chilled water coil. A plurality of thermal zone blowers conduct conditioned air from the conditioned air chamber to respective thermal zones of a building space. Electronic controller circuitry of the system is coupled for thermal demand control of the heat pumps and the thermal zone blowers for operation of the first heat pump during average thermal load and for operation of both heat pumps during greater thermal load. For chilled or hot water systems, the controller controls operation of thermal zone blowers and motorized valves which control the flow of water to and from the water coils. The electronic controller circuitry further provides thermostat control circuitry having set point change capability at any of the thermal zone thermostats and periodically reverses heat pump operation to compensate for uneven wear.

37 Claims, 17 Drawing Sheets

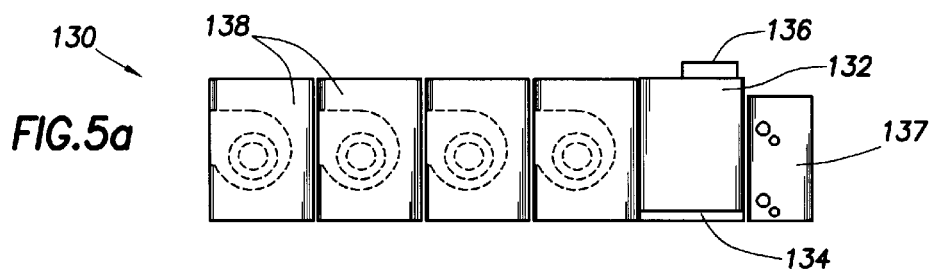
FIG.5a
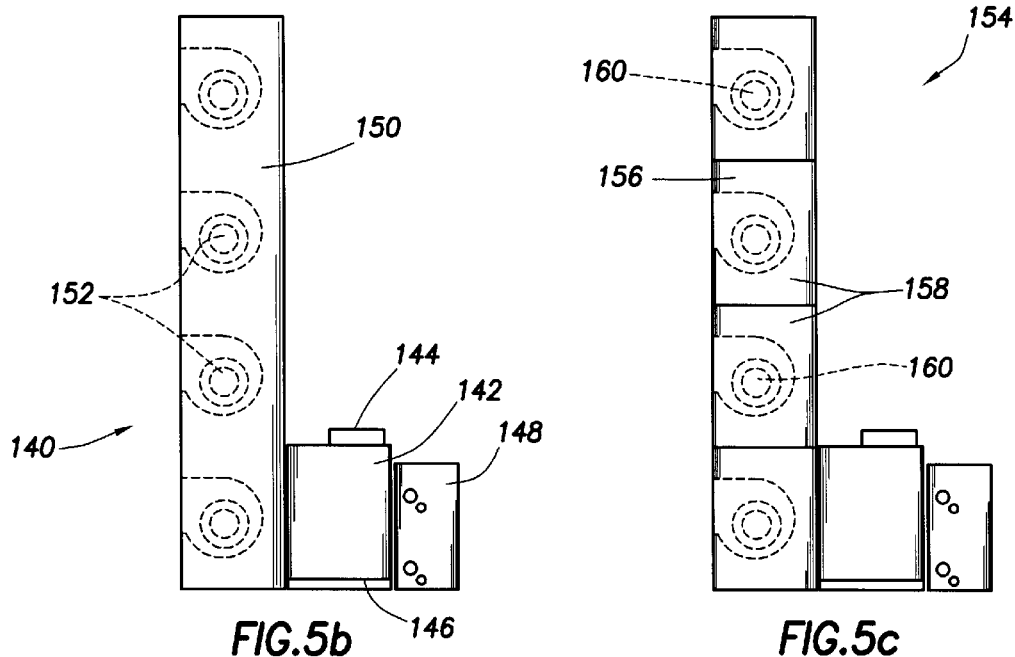
FIG.5b  FIG.5c
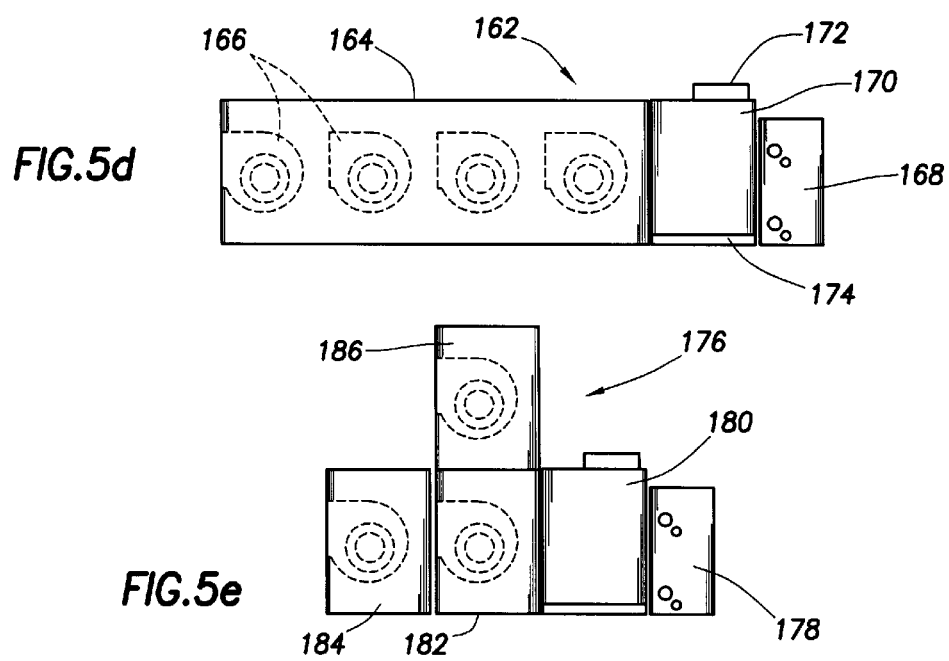
FIG.5d
FIG.5e

ZONE DEMAND CONTROLLED DUAL AIR CONDITIONING SYSTEM AND CONTROLLER THEREFOR

CROSS-REFERENCE TO RELATED PATENT

The present invention is related to the subject matter of U.S. Pat. No. 5,701,750, issued on Dec. 30, 1997 to Robert W. Ray and entitled "Zone Demand Controlled Dual Heat Pump System and Controller Therefor".

FIELD OF THE INVENTION

The present invention relates generally to air conditioning systems for cooling and heating enclosures, such as are defined by domestic and commercial buildings. More particularly, the present invention provides a zone demand controlled dual source cooling and/or heating air conditioning system having an electronic controller system for mode selection and operation.

SUMMARY OF THE INVENTION

It is a principal feature of the present invention to provide a novel zone demand air conditioning system having a plurality of sources of heating and cooling, each being individually controlled for providing heating or cooling to meet the then current demand of a building structure and having a plurality of conditioned air supply ducts conducting conditioned air to individual zones of the building structure, with a thermostat for each zone and with an electronic controller circuitry for controlling zone blowers response to sensed zone temperature and for operation of the air conditioning system responsive to mode selection including, "cooling", "heating", "fan only" and "off".

It is another feature of the present invention to provide a novel air conditioning system that may use various sources of cooling and heating equipment, such as heat pumps, chilled water, heated water, refrigerant compression and expansion systems, electric heating strips and combinations of the above and which are operable in cascade arrangement for operation according to thermal demand.

Briefly, the present invention, herein referred to as "Cascade Energy Saver" (CES), relates generally to air conditioning systems which are employed for both heating and cooling of rooms within domestic dwellings and commercial buildings. More specifically, the present invention concerns a zone demand controlled multiple blower fan coil system which either is transfering heat to an evaporative coil circulating refrigerant R-22 or R 410a or transferring heat to a water coil or coils, whether separate coils, one being for chilled water and the other being used in conjunction with hot water, thereby being connected to equipment, whether split system heat pumps or chillers, boilers and pumps, and its electronic control system which employs state of the art solid state electronics installed so as to control the operations between the equipment, the CES and the space temperature of the conditioned chamber. Even more specifically, the CES integration of these assorted components to effectuate a fan coil that when properly applied to the application, the conditioned chamber is maintained at desired set point temperatures and the plurality of the conditioned chambers utilizing the conditioning effects whether cooling or heating, are maintained contemporaneously with accuracy and efficiency.

BACKGROUND OF THE INVENTION

The inside spaces of building structures such as domestic dwellings and commercial buildings have in the past been cooled by a conventional air conditioning system having a heat exchanger installed externally to the building structure incorporating refrigerant heat exchange equipment whether air cooled or water cooled using coils, heat exchange blower and a compressor for achieving pressurized circulation of refrigerant such as freon R-22 or Puron R-410a with the effects of heat transfer being delivered to the conditioned chamber via the movement of refrigerant in the case of split system direct expansion system, or water lines circulating hot or cold water via pumps. Too, the typical air conditioning system also incorporates an air flow conduit system and a coil for heat exchange and a blower for circulating air through the conduit system to and from the inside space of the building structure. Typically the air conditioning system will also incorporate a condensed moisture collection and discharge system. For the purpose of heating, conventional building structures are provided with separate heat exchange systems which may employ electric resistance heaters, hot water coils or gas fired heating. Typically the blower of the heat dissipating exchanger of the air conditioning system will be large enough to also serve as the blower for circulating heat to and from the heat exchange apparatus in the case of heat pumps which extract heat from the ambient environment and through compression, transfer this heat to the conditioned chamber. The air conditioning system or the heating system may be manually selected or, as is typically the case, may be automatically selected by control circuitry having a thermostat for its sensing and control.

For a significant period of time alternative heating and cooling systems have been developed, typically referred to as heat pumps, which are typically electrically energized. A heat pump differs from conventional air conditioning systems only in the heat cycle. In the cool cycle the heat pump system incorporates an external condenser and internal evaporator each having heat exchange coils and blowers. In the cooling cycle the condenser unit circulates air across heat exchange coil through which refrigerant is circulated. The refrigerant gas absorbs the heat and the resulting cool air is circulated through an air supply and return conduit system that circulates the conditioned air to internal zones or spaces within the building structure. Simultaneously air that becomes heated by virtue of its presence within the zones of the building structure is circulated back through the coils for reheating the refrigerant which corresponds to a cooling effect to the air being circulated. The heat absorbed refrigerant is then circulated to the coils of the condenser located externally of the building structure and is liberated by the heat exchanger of the condenser into the external environment.

The heating cycle of the heat pump simply reverses the cycle. The heat is absorbed from the outside coils of the condenser and is exchanged via the coils of the internal evaporator so that heated air is circulated into the spaces of the building structure via the air circulation conduit system. Thus, the heat pump is a single air conditioning system that functions for both cooling and heating of the building structure, typically in response to thermostatic control. The process of exchanging heat by circulation of the refrigerant and having air to refrigerant heat exchange can also occur with refrigerant to water on both the evaporator and the condensor. If on the evaporator side, this process is referred to as reversed cycle chiller and if on the condenser side, it is referred to as water source heat pump and if from loops of piping in the ground it is referred to as ground source heat pumps.

It is typical for air conditioning systems to be designed and selected for peak load conditions and to employ a single air conditioning that is of sufficient capacity to accommodate the maximum peak load that will be experienced at any particular point in time. The block load as it is sometimes called is also the same as the building envelope load. Many times, the connected equipment, which is sized big enough to satisfy the sum of the individual zones, is larger than the peak building envelope load capacity requirement. The CES has by virtue of the multiple zones, the capability to be selected and sized for the peak building envelope load, though the number of zones served, may be summed up and represent a larger needed capacity. The CES will provide the required conditioning through the phenomenon called "swing", as most tyically seen when a building has a large East exposure and West exposure. This circumstance is where the sum of the individual zones will exceed the peak building envelope load, but neither of the individual zones in and of itself will exceed the peak building envelope load. Therefore, by selecting the equipment capacity to be equal to or if by nominal sizes available larger than the peak building envelope load, the conditioned chamber will be satisfied. For this reason, air conditioning and heat pump systems will typically operate continuously under peak heat load conditions but at other times will cycle on and off as determined by thermostatic control. Maximum electric energy utilization occurs when the units are undergoing start up and initial refrigerant compression. Consequently, when a large unit cycles many times during each 24 hour period electrical energy utilization can be quite high. It is desirable therefore to provide system having the capability of accommodating a wide range of cooling and heating conditions and yet functioning at nominal electrical energy utilization. Likewise it is desirable to avoid the electrical spikes associated with starting a compressor, thereby minimizing both equipment wear and cost of electrical usage. It is also desirable to provide a system having the capability of substantially continuous operation of at least one stage of conditioning with other stages being in standby to thereby minimize start up cycling and thus provide for lower electrical energy requirements for handling a wide range of cooing and heating loads.

SUMMARY OF THE CES INVENTION

It is therefore a principal feature of the present CES invention to provide a novel conditioning system for domestic dwellings and commercial building incorporating Equipment which operates substantially at reduced electrical conditions to accommodate normal conditioning loads while the secondary capacity which is inherent to the unit operates intermittently to accommodate conditions of peak conditioning load. The CES invention uses (1. Split system heat pump units, typically sized to be one-half the total building envelope load capacity requirements, (2. Reversed cycle chillers with capacity controllers such as multi-speed compressors and hot gas bypass, (3. Chillers and boilers with pumps and a circulating system incorporating 2 way or 3 way motorized control valves, (4. Chillers with pumps and a circulating system incorporating 2 way or 3 way motorized control valves for cooling and the heating accomplished with electric resistance heating elements that are in the air stream of the CES whether in the upstream side of the blowers or in the discharge of the blowers as they are connected to the conduit air circulating system.

It is another feature of this invention to provide a novel system wherein the air conditioning equipment is segmented into roles of being designated as primary for substantially continuous operation under average conditioning load conditions and secondary air conditioning equipment being designated as the lag unit for simultaneous operation along with the primary air conditioning equipment under peak conditions of air conditioning load.

It is also a feature of this invention to provide a novel air conditioning system wherein primary and secondary equipment being employed can be switched from their current lead-lag role to that of lag-lead respectively to balance the equipment hours usage.

Briefly, the various objects and features of the present CES as an invention are effectively realized through a provision of an air conditioning system that is electronically interconnected for cascade operation when used in a heat pump arrangement and is provided with independent thermostatically controlled blowers for each of a multiple of zones that are designated within a domestic or commercial building structure. In this case, at least a pair of heat pumps are provided each of which is capable of accommodating average heat load conditions, so that one of the heat pumps is operational under average heat load conditions while the other heat pump is deenergized. When the heat load to the building structure reaches its peak conditions the second heat pump will become energized, so that the two heat pumps functioning together will effectively accommodate the peak heat load. Thus, the primary heat pump operates during most of each day to accommodate nominal heat load conditions and the secondary heat pump operates only during limited periods of heat load. The first heat pump will seldom cycle on and off during each day, thereby maintaining its electrical energy utilization at a nominal level since the high energy needs for cycling seldom occur. The secondary heat pump unit operates only under peak load conditions and thus it also cycles infrequently so that its electrical energy utilization is also at a nominal level. The first and second heat pumps are operated via an electrical control system incorporating a switch for reversing the primary and secondary heat pump designations, so that the primary heat pump becomes the secondary heat pump and visa versa to thereby maintain optimum service life of both heat pumps. The provision of the CES of the present invention includes the design of the refrigerant evaporator coil which as specific circuits, and are split 50/50 in such a way that both the air and the circulating refrigerant are cascaded. This means that the cooling effects are magnified to a certain extent as a result of the circuiting in such a way that there is greater dehumidification and greater sensible heat extraction. The refrigerant circuits are controlled from freezing through both simple temperature sensitive switches that break the control circuit serving the relays and contactors as well as more elaborate methods of multi-speed motored compressors, compressors with unloading capabilities for the intake reed valves if reciprocating or bypass valves and sliders if constructed as a positive displacement compressor similar to scroll designs and also the hot gas bypass into the evaporator coil to maintain suction temperature and pressures.

Within the building structure there are designated comfort zones which are each provided with a conditioned air supply provided by an independent air supply blower for each zone. These blowers are driven by electric motors whether of the type that is constant speeds by multi-tapped core windings or by variable speed by virtue of controls affording variable frequency output from 0–60 hertz. Each of the comfort zones is also provided with a thermostat so that the air supply blower for that particular zone will operate only when the comfort load within that zone is different than the setting of the thermostat, whether heating or cooling mode and such that if the measured temperature is one degree away from set point, the CES will respond via the control logic of an electronic control system, typically mounted on an environmental control board (ECB) to energize blower fans, and equipment as required for creating multiple stages of cooling and heating. To the extent that the system is a heat pump system, both of the coil circuits of the evaporator coil will accommodate refrigerant from the primary and secondary heat pumps which are connected so that the effect of the refrigeration is in tandem, thusthe return air being drawn into the system and by the optional return air blower will be forced across the heat interchange surfaces of both of the coils to thus provide for heat exchange from the refrigerant passing through either or both of the coils. The multiple air supply blowers of the respective heat zones of the building structure each have their inlet side in communication with a conditioned air chamber or manifold so that cooled or heated air as the case may be is immediately available to each of the air supply blowers so that the conditioned air can be directed immediately to the thermal zone of necessity.

In the case of the the heat pump systems, each is provided with low and high conditions of heat pump operation and each is capable of operating so as to supply heated or cooled air to the air supply manifold depending upon the thermal conditions that are sensed by the respective thermostats. The systems that have air conditioning equipment that is comprised of chillers, reversed cycle chillers, boilers and pumps, with variable frequency drive (VFD) motor driven blowers, with ground source and water cooled heat pumps, there is logic in the firmware of the microprocessor on the ECB which causes sequencing, staging, cycling of fans, etc. to occur based on the zone thermostat's configuration and set point.

Depending on the type of air conditioning equipment connected to the CES unit, each zone may act independently, such that one or more zones may call for cooling while one or more of the remaining zones may call for heating, these conditions occurring simultaneously.

BRIEF DESCRIPTION OF THE DRAWINGS

The various objects and advantages of this CES invention will become apparent to those skilled in the art upon an understanding of the following detailed description of the invention, read in light of the accompanying drawings which are made a part of this specification and in which:

FIGS. 5a–5e are diagrammatic illustrations showing various possible arrangements or configurations of the equipment that comprises a thermal demand controlled air conditioning system installation within the scope of the present invention, whether used internal to a building structure or external as in the case of being roof mounted and including vertical, both modular and unitary installation, and horizontal, both modular and unitary installation;

DETAILED DESCRIPTION OF PREFERRED EMBODIMENT

Figure 1:
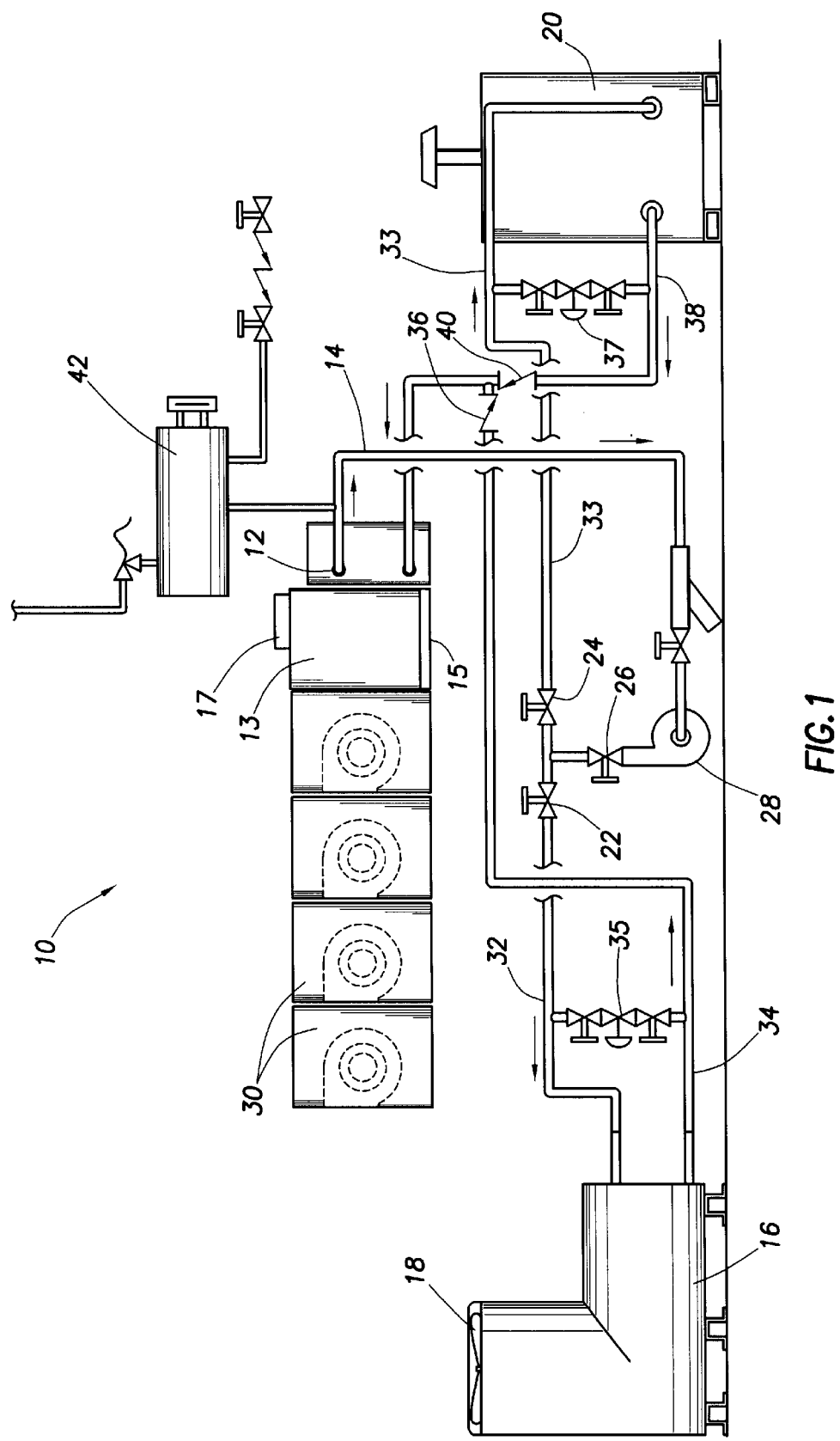
FIG. 1 is a diagrammatic and schematic illustration of a thermal demand controlled air conditioning system embodying the principles of the present invention and having a water coil, a weter circulation pipe system, with a chiller and a boiler and with two way control valves and multi-tapped constant speed motors providing the motive force for water circulation and air circulation.

Referring now to the drawings and first to FIG. 1, there is shown generally at 10 a diagrammatic and schematic illustration of a thermal demand controlled air conditioning system embodying the principles of the present invention. The air conditioning system embodiment of FIG. 1 has a water coil 12 to which is connected a water circulation pipe system 14, with a chiller 16 having a motorized fan 18 and a boiler 20 and with control valves 22, 24 and 26 and multi-tapped constant speed motors 28 and 30 for selective hot and cold water circulation and for air circulation to provide for thermal interchange between the hot or cold water, as the case may be and the air being circulated across the water coil. A housing structure 13, within which the water coil 12 may be located, is provided with a drain pan 15 for collection and disposal of condensate that occurs as thermal interchange occurs. A control box 17 is mounted on the housing structure 13, but may be located elsewhere, and contains the primary electronic circuitry for controlling operation of the air conditioning system.

The air cooled chiller 16 has an internal heat transfer coil which is connected to an inlet conduit 32 and an outlet conduit 34, with the outlet conduit being connected across a two way control valve 36 to the water coil 12. Likewise, the outlet conduit 38 of the boiler 20 is connected across a two-way control valve 40 to the water coil 12, thus permitting chilled water or heated water to flow through the water coil for cooling or heating, depending upon the positions of the two way control valves 36 and 40. The motor driven pump 28 has its discharge connected across control valve 26 to selected ones of the water inlet conduits 32 or 33 depending upon the settings of the control valves 22 and 24, one of which is open while the other is closed, to permit either cooled or heated water to be circulated through the water coil for cooling or heating of the air being circulated past the water coil by one or more of the blowers 30. The chiller 16 and the boiler 20 are provided with two-way valve assemblies shown generally at 35 and 37 respectively. The sequence of operations for the air-cooled chiller and boiler is controlled by the environmental control board, which receives feedback from the individual zone thermostats. This feedback is used to determine the mode (heat, cool, fan or off), the speed of the zone blower and the position of the two-way valve(s). If the mode is "cooling", then the chiller and pump are energized. If the mode is "heating", the boiler instead of the chiller is energized along with the pump. The feedback from the thermostat comes from the measured difference of the thermostat's temperature setting (set point) and the dry bulb temperature of the air in that zone. This difference determines the position of the two-way valve and the blower speed.

For example, assume that the thermostats are in the "cooling" mode and all the thermostats are satisfied. Each zone thermostat is satisfied when the difference in the set point temperature and the zone temperature is less than one degree. In this case the chiller and the pump are energized by the environmental control circuitry because the thermostats are in the "cooling" mode. The pump is on and stays on circulating water continuously as long as the environmental control circuitry has feedback from the thermostat(s) that the mode is in "cooling". The Chiller will automatically cycle the compressor(s) on and off to maintain the user-definable chilled water temperature set point on the outlet of the chiller using its on board control devices. In this condition, the twp-way valve is open 100%, thus the coil is bypassed 100% and the fan blower is off.

When the temperature rises in a zone so that the thermostat's room temperature is one but less than two degrees Fahrenheit above the set point, the thermostat sends continuous digital signals to the environmental control circuitry, which are interpolated. The environmental control circuitry outputs as a sequence of steps for the stem to open or close thereby regulating the amount of water flowing through the coil verses what is being bypassed through the two way valve. This is called the "feedback-loop". When de-energized, the valve will shut (fail-safe position). The feedback loop of the thermostat will close the valve in multiple steps to allow water to enter the coil in small percentage increments. When the valve is 100% shut, all the water goes through the coil. The pump maintains a constant chilled water circulation rate. The zone blower is operating at low speed.

When the temperature rises in a thermal zone of the building so that the thermostat's room temperature is two degrees Fahrenheit or greater above the set point, the thermostat's digital signal that is continuously being sent to the environmental control circuitry, is interpreted and the environmental control circuitry outputs a signal to modulate the position of the valve stem to be more closed, thus forcing more water through the coil as compared with the volume of water that is being bypassed through the two-way valve. This is called the "feedback-loop". When de-energized, the valve will shut (fail-safe position). When the valve is 100% shut, all the water goes through the coil. The Chiller will automatically cycle the compressor(s) on and off to maintain the user-definable chilled water temperature set point on the outlet of the chiller using its on board control devices. The pump maintains a constant chilled water circulation rate. The zone blower is operating at high speed.

An expansion tank 42 is connected to the piping system 14 and accommodates minute variations in water supply, without permitting excessively high or low water pressure from either the chiller water circuit or the boiler water circuit.

Figure 2:
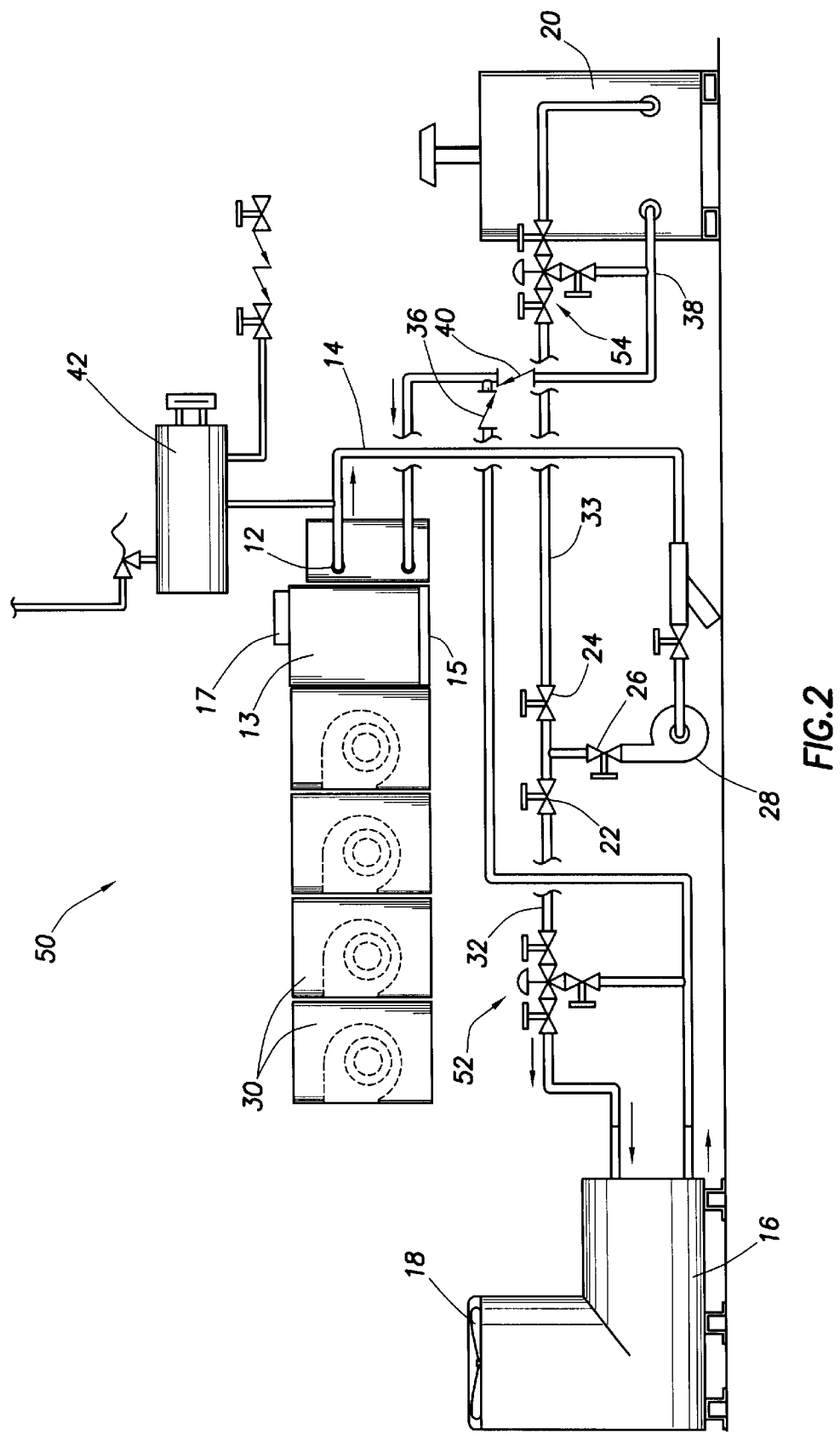
FIG. 2 is a diagrammatic and schematic illustration of a thermal demand controlled air conditioning system according to the present invention, having a water coil for heat exchange and water and air circulation systems, with a chiller and a boiler as thermal sources and having two way control valves and multi-tapped constant speed motors.

With reference to FIG. 2, an alternative embodiment of the present invention, shown generally at 50, is quite similar to the embodiment of FIG. 1 and differs therefrom only in that three-way valve assemblies are utilized to select hot or cold water flow from the boiler or chiller through the water coil to accomplish heating or cooling of the air passing across the water coil for thermal interchange. In FIG. 2, like reference numerals are used for like components as compared with FIG. 1. As is evident from FIG. 2, three-way water circulation control valve assemblies, shown generally at 52 and 54 are provided respectively for the chiller 16 and the boiler 20. An engineer selects and designs a system with a three-way valve when exact control is required. The three-way valve is mounted in either the inlet or the outlet piping to the coil. The three-way valve is a positive shut off/positive mixing type of valve, such that exact volumes of water are regulated to the coil. The sequence of operations is the same as the two-way valve described above.

Figure 3:
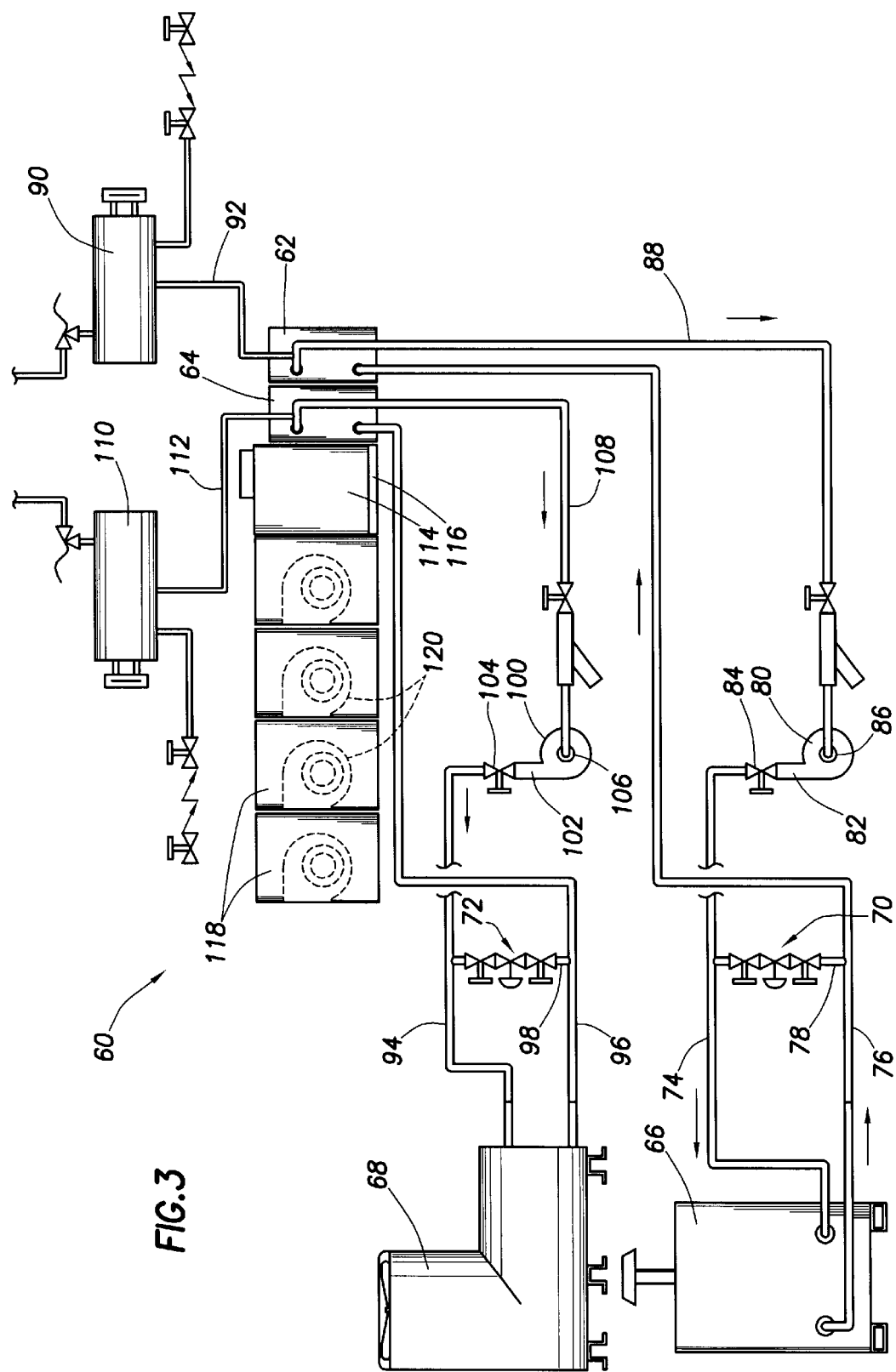
FIG. 3 is a diagrammatic and schematic illustration of a thermal demand controlled air conditioning system according to the present invention, having a chilled water coil and a hot water coil and with a chiller and a boiler, a four pipe system for chilled water and hot water circulation and having two way control valves and multi-tapped constant speed motors.

Referring now to the alternative embodiment, shown genrally at 60 in FIG. 3, separate water coils 62 and 64 are provided for circulation of hot or cold water from a boiler 66 or a chiller 68, with separate two-way control valve assemblies, shown generally at 70 and 72 being interconnected with the respective inlet and outlet water flow lines of the boiler and chiller. From the boiler 66 extends inlet and outlet water flow lines 74 and 76 having an interconnected flow control line 78 to which the two-way valve assembly 70 is connected. A water pump 80 has its discharge conduit 82 connected to the water inlet line 74 via a valve 84 and its pump inlet 86 connected with a return flow line 88 which receives water from the hot water coil 62. An expansion tank 90 is connected by an expansion line 92 with the return flow line 88 and functions to accommodate any undesirable pressure changes that might occur in the boiler water flow system. Likewise, the air cooled chiller 68 is provided with inlet and outlet water flow lines having a flow control line 98 connected thereto. The flow control line is provided with the two-way control valve assembly 72 as shown. A motor driven pump 100 has the discharge line 102 thereof connected to the inlet line 94 across a valve 104 and its inlet or suction 106 connected to the return line 108 of the cold water coil 64. The water outlet line 96 of the chiller 68 is connected to the inlet of the cold water coil 64 as shown.

The cold water coil 64 is connected with an expansion tank 110 via an expansion line 112 to accommodate pressure changes that might interfere with optimum water flow and service life of the chilled water flow system of the cascade air conditioning system of FIG. 3.

The hot and chilled water coils 62 and 64 are located within a housing through which return air flows, thereby conditioning the air by selective hot or cold thermal interchange. The conditioned air is then caused to flow through a housing distance piece 114 which is connected to or is a part of the housing within which the water coils are located. A condensate collection and drainage pan 116 is provided at the lower portion of the housing or distance piece and includes a drain line enabling excess condensate to be drained away for disposal. The housing structure of the air conditioning unit includes a plurality of blower sections 118 each having at least one motor driven blower 120 that has its blower discharge in communication with a conditioned air supply conduit that extends to one of the plurality of zones of the building structure. It should be borne in mind that the housing structure may be in the form of a single housing unit having all of the blower mounted to receive conditioned air therefrom, with conditioned air supply conduits extending from the blowers to the respective zones of the building.

Figure 4:
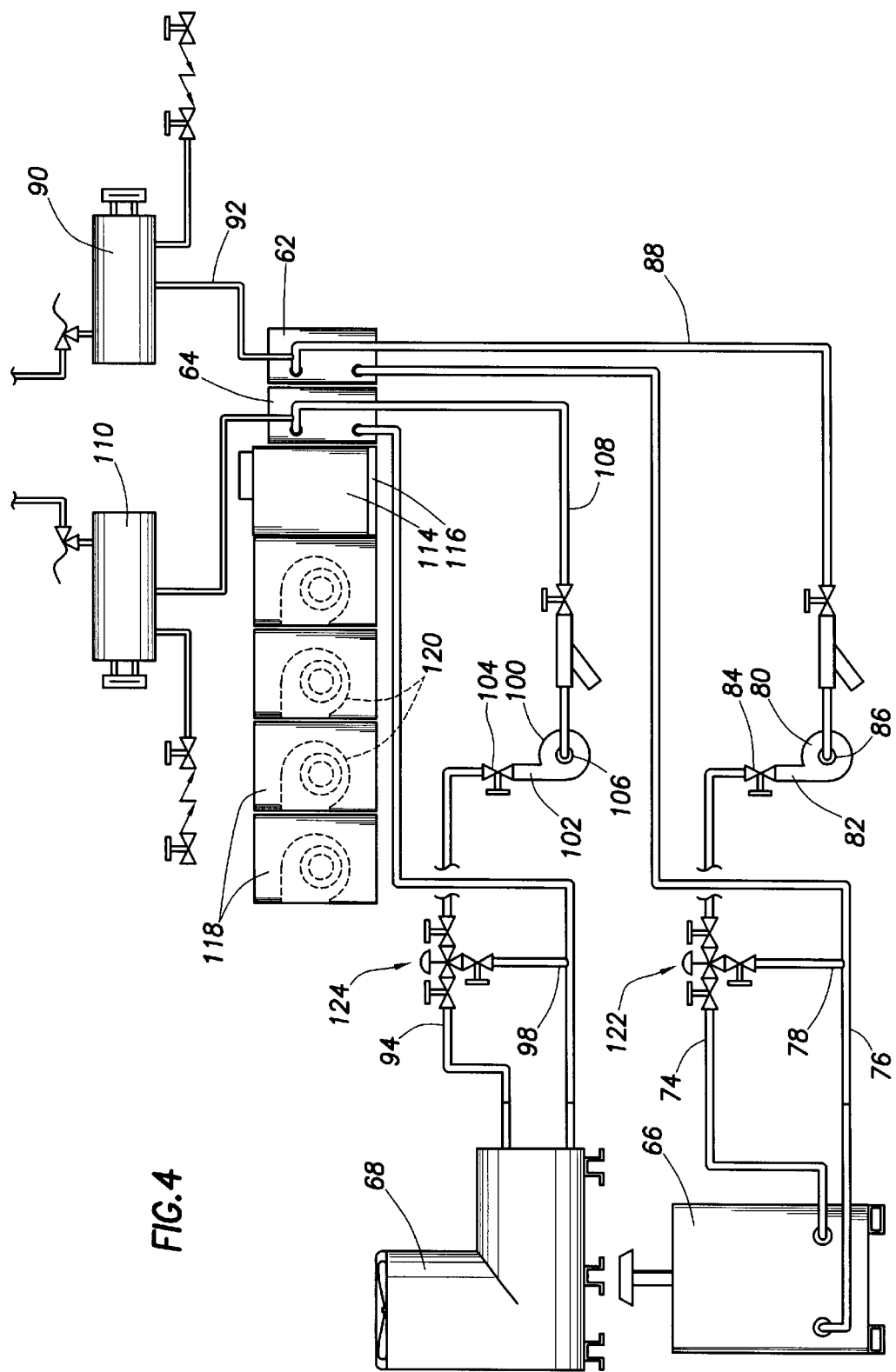
FIG. 4 is a diagrammatic and schematic illustration of a thermal demand controlled air conditioning system according to the present invention, having chilled water and hot water coils and having a chiller and a boiler, and for circulation of water having a four pipe system,with three way control valves and multi-tapped constant speed motors.

The alternative embodiment of FIG. 4 is similar to the embodiment of FIG. 3, with the exception that three-way control valve assemblies 122 and 124 are interconnected respectively with the inlet and outlet flow lines of the boiler 66 and the chiller 68. Other like components of FIGS. 3 and 4 are indicated by like reference numerals for ease of understanding.

FIGS. 5a–5e are elevational views showing representative examples or configurations that may be utilized by either the heat pump embodiments or the water circulation embodiments of the present invention. FIG. 5a is representative of a modular version of the cascade energy system of the present invention, shown generally at 130 and which is designed for eight thermal zones of a building. The arrangement 130 has a distance piece 132 with a condensate drip pan 134 therein as described above and has a coil unit 136 which may include one or more refrigerant coils or one or more water coils for heat transfer with air being circulated across the coils. A plurality of blower sections 138 are secured in assembly and collectively define a chamber from which conditioned air is drawn by the blowers. Each of the blower sections is typically provided with two blowers, each having its conditioned air discharge in communication with a conditioned air conduit leading to one of the thermal zones of the building. The modular arrangement of FIG. 5a is generally horizontal.

In FIG. 5b the elevational illustration shows a unitary arrangement generally at 140 having a distance piece 142, including a control box 144 and a condensate drip pan 146, and being associated with a coil unit 148 similar to that described in FIG. 5a. A unitary conditioned air housing 150 defines a single conditioned air chamber and provides support for a plurality of motor driven air blowers 152, each having the air discharge thereof in communication with one of the thermal zones of the building via a conditioned air supply conduit. The elevational illustration shown generally at 154 in FIG. 5c is similar to that of FIG. 5b, with the exception that the conditioned air housing and chamber 156 is defined by a plurality of modular housing units 158 each having at least one and typically a pair of motor driven air blowers 160.

The unit arrangement of FIG. 5d, and shown generally at 162, is very similar to the horizonal unit arrangement of FIG. 5a, with the exception that the conditioned air housing and chamber 164 is of unitary construction, with a plurality of motor driven air blowers 166 each having the air discharge thereof in communication with one of the thermal zones of the building via a conditioned air supply conduit. A coil unit 168, having refrigeration coils or water coils is arranged to receive return air from all of the thermal zones of the building and to condition the air for re-circulation. The coil unit 168 is arranged to conduct conditioned air into a distance piece 170 that also provides support for a control box 172 and includes within the lower portion thereof a condensate drip pan 174 which collects condensate and directs it to a condensate drain of the pan for disposal.

Individual conditioned air handling units may also incorporate horizontally and vertically arranged modular housing sections as shown in the arrangement shown generally at 176 in FIG. 5e. In this case, a coil unit 178 and a distance unit 180 are arranged in the manner shown in each of the FIGS. 5a–5d. For handling of the conditioned air flowing through the distance piece from the coil unit, modular housing units 182 and 184 are arranged horizontally and modular housing unit 186 is arranged vertically above modular housing section 182. Other housing units may be arranged in horizontal or vertical association with the housing units 182, 184 and 186 as desired to provide the desired number of motorized air blowers that correspond with the number and size of the various thermal zones that receive conditioned air from the conditioned air chamber that is collectively defined by the modular housing units.

Figure 6A:
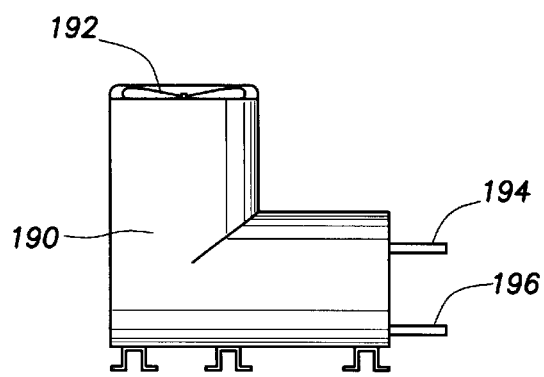
FIGS. 6a–6d are diagrammatic illustrations showing various types of water chillers and water heaters that can be employed in conjunction with the present invention.
Figure 6B:
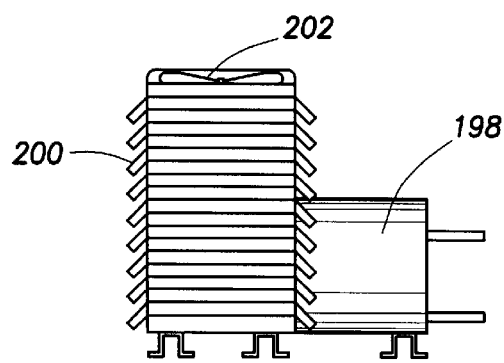
Figure 6C:
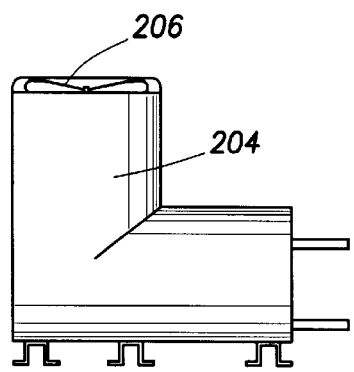
Figure 6D:
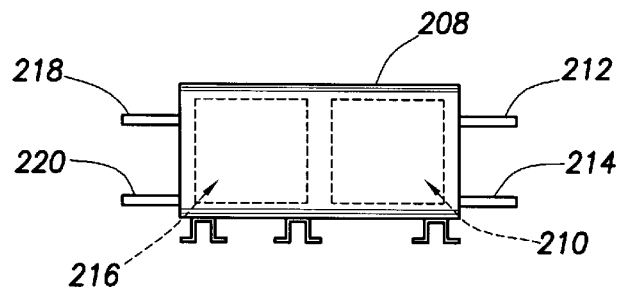

FIGS. 6a–6d are elevational views illustrating the different types of chiller units and heat exchanger units that may be employed. FIG. 6a shows an air cooled chiller unit 190 having a motor driven fan 192 for moving air across the internal coil or coils of the chiller unit. Water inlet and outlet conduits 194 and 196 provide for water interchange with the internal coil or coils and to valve and pump controlled water handling equipment such as is discussed above in connection with FIGS. 1–4. FIG. 6b shows a water cooled chiller 198, with a cooling tower 200 permitting the flow of cooled water over the coils within the unit. One or more motor driven fans 202 also cause environmental air flow across the coils to enhance thermal interchange with the water being circulated through the coils of the coil unit, such as is shown at 20 in FIGS. 1 and 2. A reversed cycle chiller is shown at 204 in FIG. 6c, with one or more motor driven fans 206 causing air flow over the internal coils of the chiller unit. In FIG. 6d a ground source reversed cycle chiller unit is shown generally at 208, having an internal chiller heat exchanger 210 having water flow through its internal coil or coils by means of water inlet and outlet conduits 212 and 214. The chiller unit 208 also includes an internal condenser heat exchanger 216, with water inlet and outlet conduits 218 and 220 being connected with the internal coil or coils thereof.

Figure 7A:
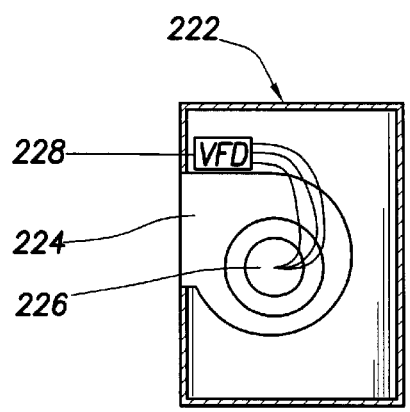
FIGS. 7a–7c are diagrammatic illustrations showing various types of electric motors and blowers that can be employed in conjunction with the air conditioning system of the present invention.
Figure 7B:
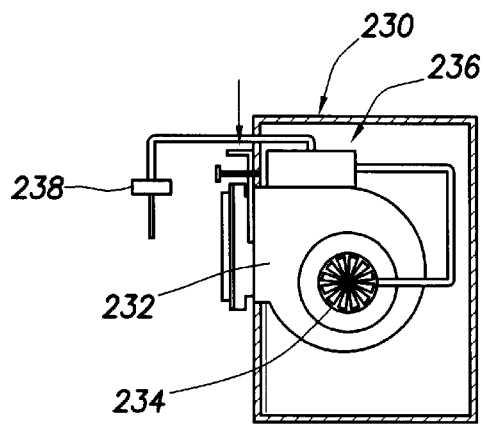
Figure 7C:
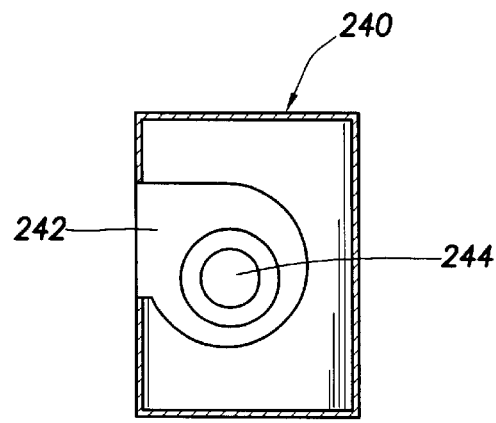

FIGS. 7a–7c are elevational views illustrating the various types of motor driven blowers that may be utilized for moving conditioned air from the conditioned air chamber to the various thermal zones of a building. As shown generally at 222 in FIG. 7a, a blower 224 is provided with a variable frequency drive motor 226 which is controlled by a variable frequency drive circuit or controller 228. As shown generally at 230 in FIG. 7b, an inlet guide vane blower 232 has inlet guide vanes 234 and a motor controller circuit 236. The controller circuit is at least in part responsive to a static pressure sensor 238 for controlling the inlet guide vanes 234. A multi-tapped multi-speed blower is shown generally at 240 and has a blower 242 driven by a motor 244 that is provided with multiple taps and is thus capable of being connected for operation at any one of a plurality of possible motor speeds as determined by the taps to which the motor circuit is connected. The motor speed can be changed simply by changing the taps to which the motor circuit is connected.

Figure 8:
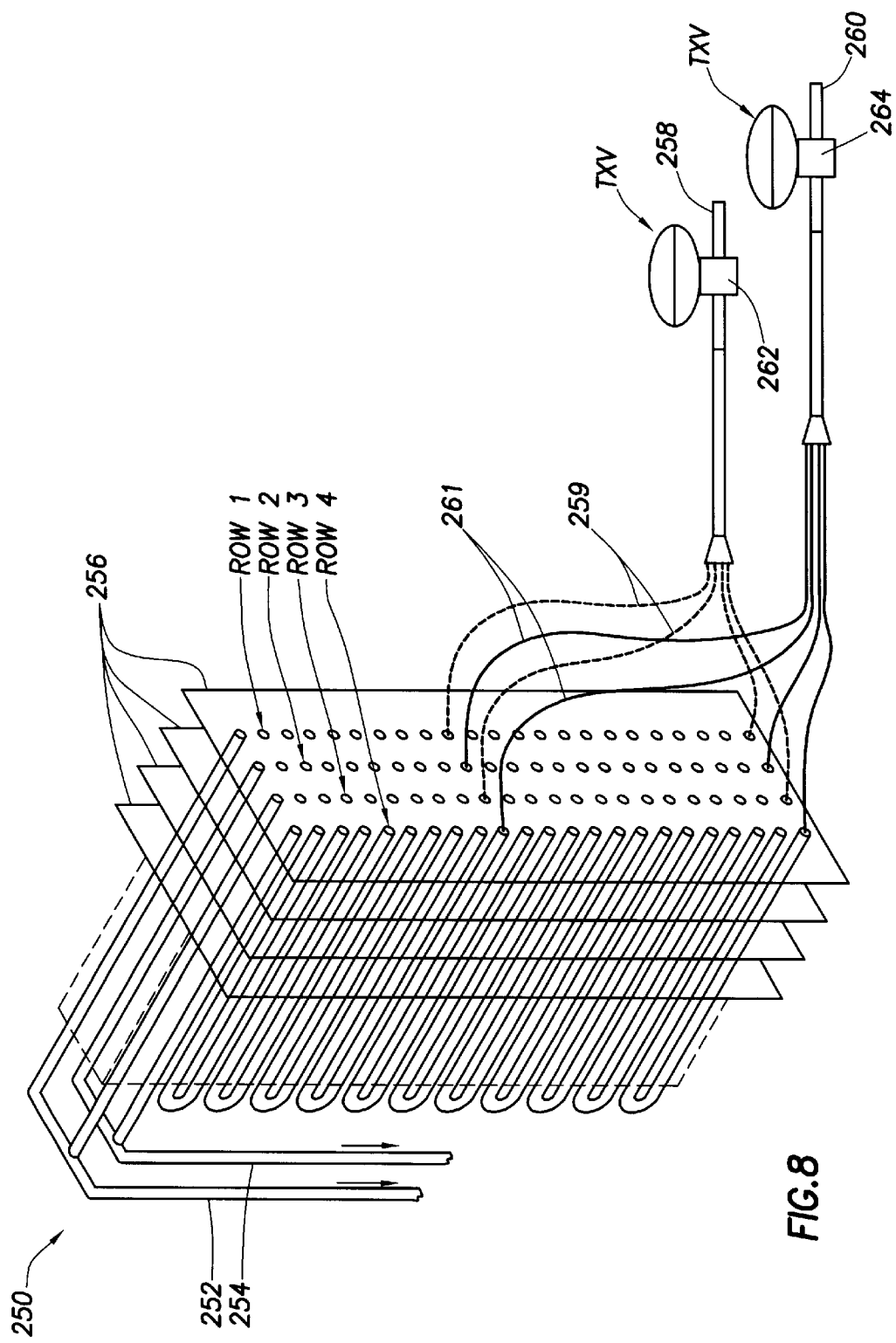
FIG. 8 is a schematic and isometric illustration of the refrigeration coil showing a plurality of refrigeration circuits within a fin and tube system and showing thermal expansion valves and other unique invention features.

The schematic isometric illustration of FIG. 8 shows a refrigerant coil design, generally at 250, that is compatible with the dual, cascade air-conditioning unit installation having heat pumps and refrigerant heat exchange coils as the thermal source. The refrigeration coil mechanism is provided with four rows of coils, shown in the Figure as Row 1–Row 4, with two of the rows of coils being connected with each of two refrigeration circuits 252 and 254 through which a suitable refrigerant fluid is circulated. A multiplicity of heat exchanger fins 256 are mounted in parallel fashion and are fixed in heat exchanging relation to each of the rows of heat exchanger coils. Compressed refrigerant fluid from a pair of heat pumps is supplied to the inlet sides of the refrigerant circuits by refrigerant supply conduits 258 and 260 under the control of one or more thermal expansion valves 262 and 264.

When the cascade arranged refrigerant coil unit is matched up with a set of heat pumps of equal size as in the case of a 6 ton coil, each heat pump is 3 tons each, then in that case and in similar cases, the supply conduit 258 of a primary heat pump is connected to vertical refrigerant coil rows 1 and 3 through a header system 259 shown by dotted lines and the refrigerant supply conduit of the secondary heat pump unit is connected by headers 261 to vertical refrigerant coil rows 2 and 4 as shown in full line. This, of course, assumes that the coils of the unit are arranged as a 4 row coil assembly. If the coil assembly were arranged as a 6 row coil, the refrigerant inlet conduit of the primary heat pump would be connected to vertical rows 1, 3 and 5 through a header system and the refrigerant inlet conduit of the secondary heat pump unit would be connected to vertical coil rows 2, 4 and 6 through a header system. This also shows that the invention must use a thermal expansion valve that has a distributor connected thereto and feeder tubes that then connect the distributor or header to the tube rows such that half of the feeder lines feed the upper half of the rows and the remaining half of the feeder lines feed the bottom half of the rows in equal distribution. Through unique calculations, the pressure drops of the refrigerant is balanced in equal proportions and the circuits are selected such that the maximum pressure drop thereto does not exceed about 10 psi with selections generally less for efficiency maximization relative to horsepower utilization. The thermal expansion valves 262 and 264, also shown as "TXV" are bi-directional and the feeder tubes are sized such that pressure drop is within that acceptable range whether in the heating or cooling mode. The thermal expansion valves 262 and 264 are therefore internally manufactured to achieve the bi-directional flow and are selected for the specific refrigerant used in the system, whether R-22 or R-410a. The power heads on the thermal expansion valves can be either pressure controlled or electronically controlled. The power head controls the actuating movement of the internal stem which moves in an up and down motion to regulate the flow of refrigerant. The stem has 100% shut off-capability when the stem is seated on an internal precision seat of the valve. Upon lifting of the stem from the seat, flow of refrigerant begins. As the valve opens, the flow is proportional to the percentage of the travel distance of the stem, so that when the stem is at its 100% open position, the refrigerant flow through the valve is 100% of valve flow capacity.

Figure 9:
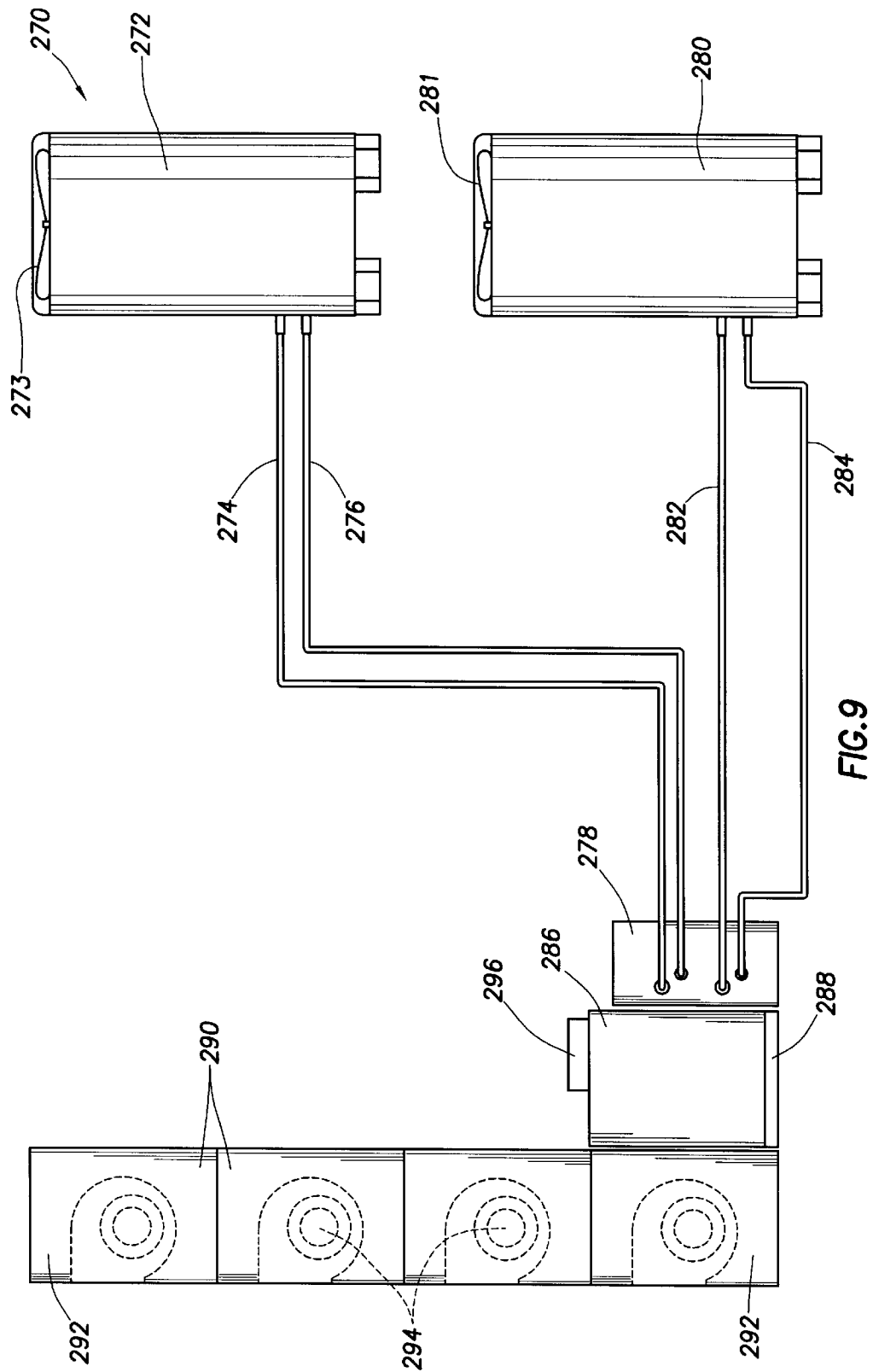
FIG. 9 is a schematic of a refrigeration heat pump system embodying the principles of the present invention and incorporating equally sized heat pumps as thermal sources.

Referring now to FIG. 9 an embodiment of the present invention incorporating a pair of refrigeration heat pumps in cascade arrangement as the thermal source is shown generally at 270. A first heat pump 272 is connected by a refrigerant supply line 274 and a refrigerant return line 276 with a set of coils of a coil unit 278. A second heat pump 280 likewise is connected by a refrigerant supply line 282 and a refrigerant return line 284 with a set of coils that are also incorporated within the coil unit 278 in the manner shown in FIG. 8. Thermal interchange of refrigerant with air at the heat pumps 272 and 280 is caused by air blown across the internal heat exchanger coils of the heat pumps by motor driven fans 273 and 281. The coil unit 278 is connected with a distance piece housing 286 having a condensate collection and drain pan 288 located within the bottom portion of the distance piece housing. Air being blown across the coils of the coil unit 278 enters the distance piece housing and is conducted to unitary or modular housing sections 290. Thus, the distance piece housing and the unitary or modular housing sections 290 collectively define a conditioned air chamber from which conditioned air from the coil unit 278 is distributed to the various thermal zones of a building. There are four modular housing sections 290 that are shown in FIG. 9 to be interconnected with one another, in series, and with one of the modular housing sections being in conditioned air receiving relation with the distance piece housing. A plurality of motor driven air blowers 292 are mounted to the respective modular housing sections 290, with the motors 294 thereof being of any of the motor types that are described above. The various motors of the cascade heat pump air-conditioning system of FIG. 9 are each independently controlled by electronic controller circuitry that is primarily located within a control box 296 that may be mounted to the distance piece housing 286, though it may be mounted elsewhere if desired. The air blowers 292 are typically mounted two to each of the modular housing sections 290, with conditioned air supply conduits interconnecting the air discharge of each motor with selective thermal zones of a building.

Figure 10:
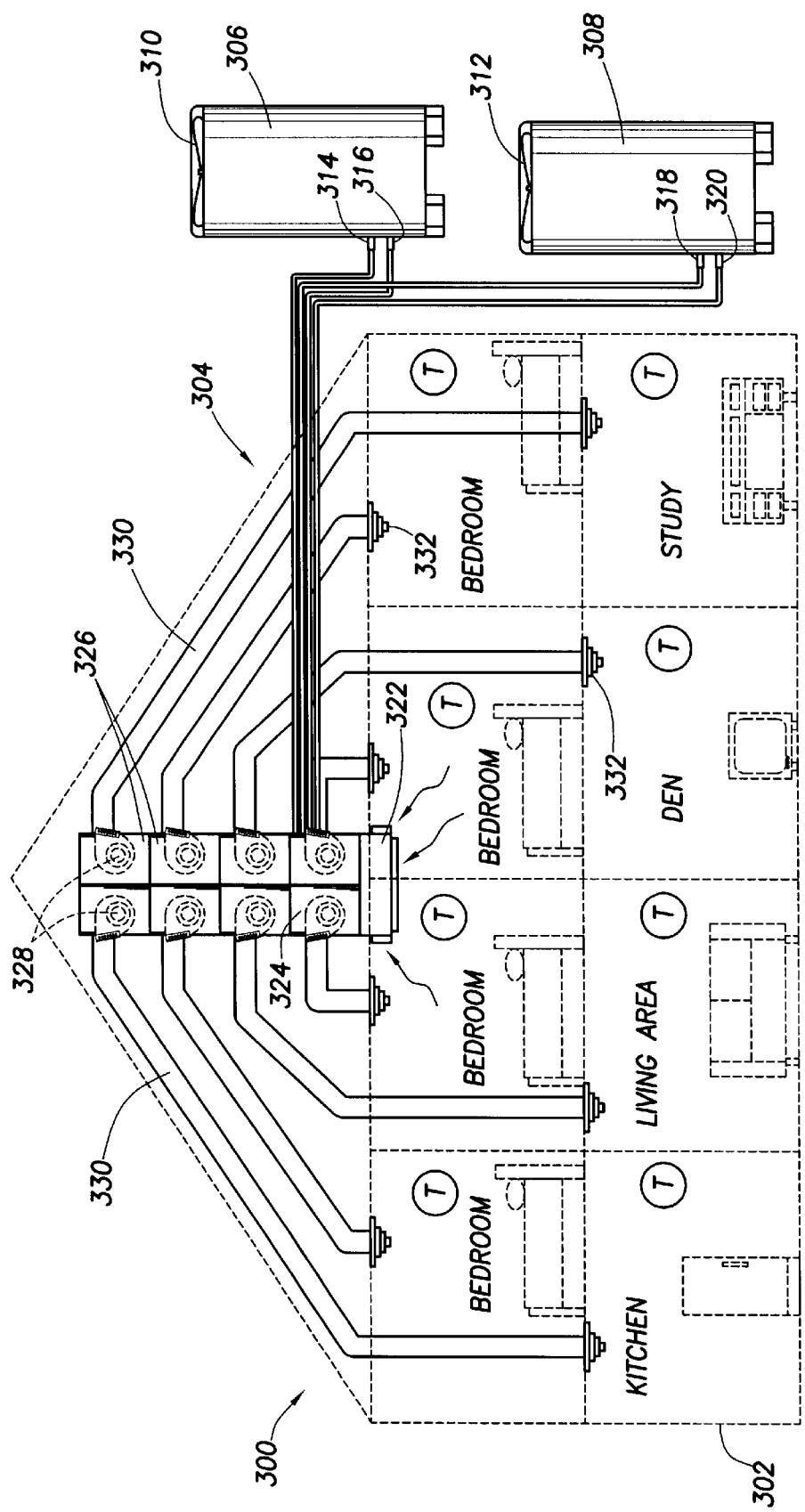
FIG. 10 is a diagrammatic illustration in section showing a building such as a domestic dwelling having eight thermal zones and a zone demand controlled air-conditioning system having cascade controlled dual heat pumps as the thermal source thereof.
Figure 11:
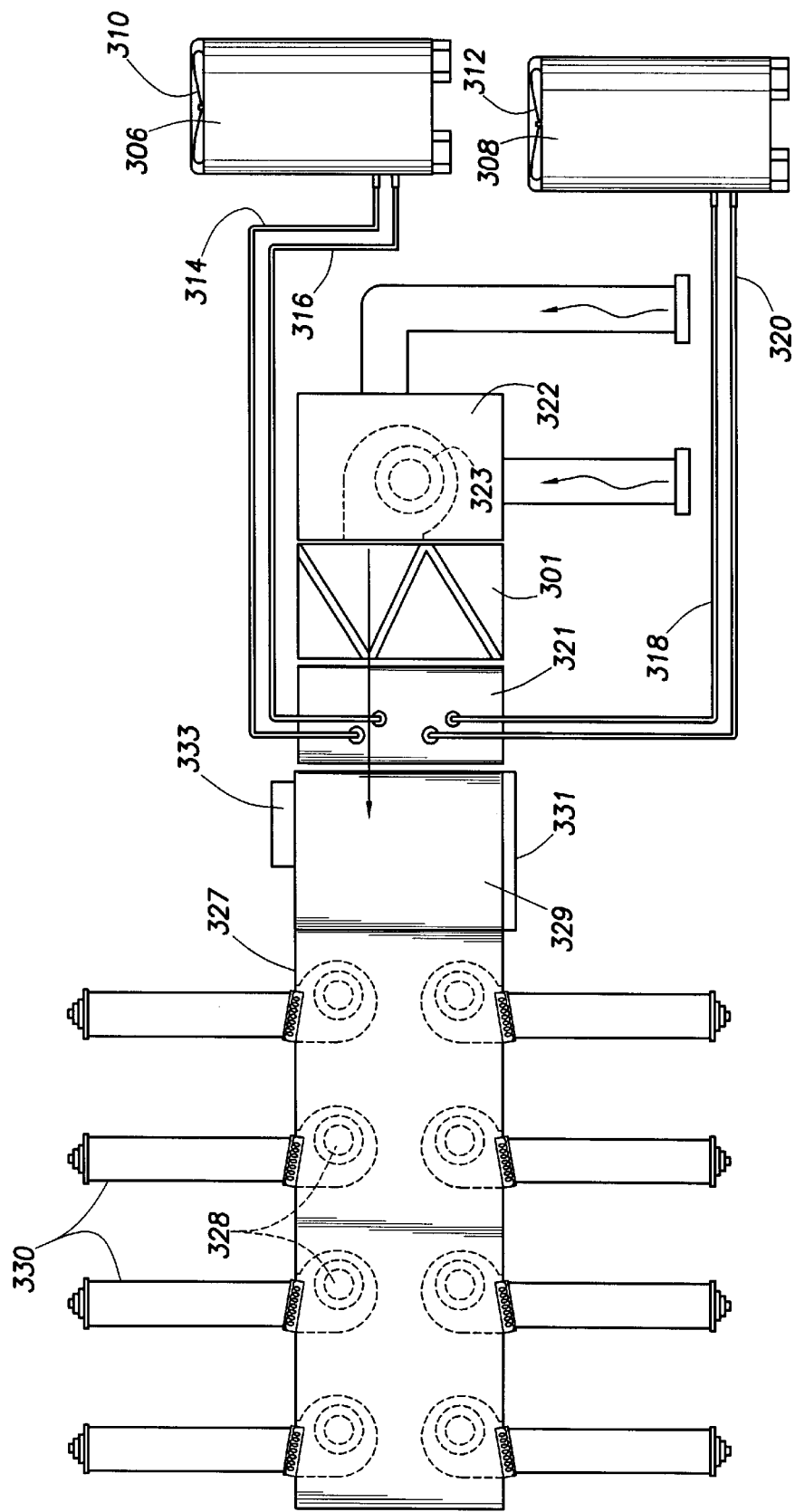
FIG. 11 is a diagrammatic illustration in plan, showing the zone demand controlled dual heat pump air-conditioning system of FIG. 10.

Referring now to FIGS. 10 and 11, a diagrammatic illustration of a building is shown generally at 300, such as a two story four bedroom domestic home 302, with a kitchen, living area, den and study, representing eight thermal zones for which heating and cooling is desired, depending upon the thermal load that exists at any point in time. A cascade arranged zone demand dual heat pump air-conditioning system is shown generally at 304 having primary and secondary heat pump air-conditioning units 306 and 308 that are each provided with electrical resistance heating strips to accommodate extremely cold ambient conditions when additional heating may be needed. From the internal refrigerant coils of the primary heat pump unit extend a refrigerant supply line 314 and a refrigerant return line 316, these lines being connected with the internal coils of a coil unit such as shown at 278 in FIG. 9 and also shown in FIG. 8. From the internal refrigerant heat exchanger coils of the secondary heat pump unit 308 extends a refrigerant supply line 318 and a refrigerant return line 320 which also communicate refrigerant from the secondary heat pump to the heat exchanger coils of a coil unit. Return air from a return air chamber 322 to which air is returned by a return air fan 323 from the various thermal zones, i.e., rooms of the building 300 is then caused to flow through a filter unit 301 and into the coil unit and thus across the heat exchanger coils so that the returned air becomes "conditioned", heated or cooled as the case may be. This conditioned air then flows into an air supply chamber 324 that is defined collectively by a plurality of modular housings 326 as shown in FIGS. 10 and 11 or a single unitary housing as shown at 327 in FIG. 11, depending on the character of unit construction that is involved in the unit design. Each of the modular housings 326 is provided with a pair of motor driven blowers 328 having the discharge thereof connected with respective conditioned air supply conduits 330. A distance piece housing 329 is connected between the coil unit 321 and the conditioned air housing of the modular or unitary housing 327. The distance piece housing is typically provided with a condensate drip pan 331 therein for collection and drainage of condensate. A control box 333 is also typically mounted to the distance piece as shown and contains the electronic control circuitry of the air-conditioning system. One benefit of the modular housing design is that it permits expansion of the conditioned air supply system of the air-conditioning unit, simply by adding a modular housing section and adding conditioned air supply conduits connecting the discharge of the motor operated blowers of the housing section with additional inlets 332 into the building.

Since the primary heat pump operates substantially continuously and the secondary heat pump cycles on and off in response to above normal thermal load, it is possible that the primary heat pump could sustain greater wear and require more frequent repair and replacement. To minimize the potential for such uneven wear, the electronic control circuitry for the air-conditioning system of FIGS. 10 and 11 periodically and automatically accomplishes reversal of the primary and secondary heat pumps, so that the secondary heat pump becomes the primary heat pump and the primary heat pump becomes the secondary heat pump. This feature ensures substantially even wear of the two heat pumps over a period of time.

At the right hand portion of FIG. 11 there is shown an air cooled chiller unit, an air cooled reversed cycle chiller unit and a boiler. These cold and hot water sources may be substituted for the heat pumps 306 and 308 in the event they are considered appropriate for the design of the air-conditioning unit. In such case, the coils would be water coils and lines rather than refrigerant coils and lines, and which would be connected and operated in the manner discussed above.

Figure 12:
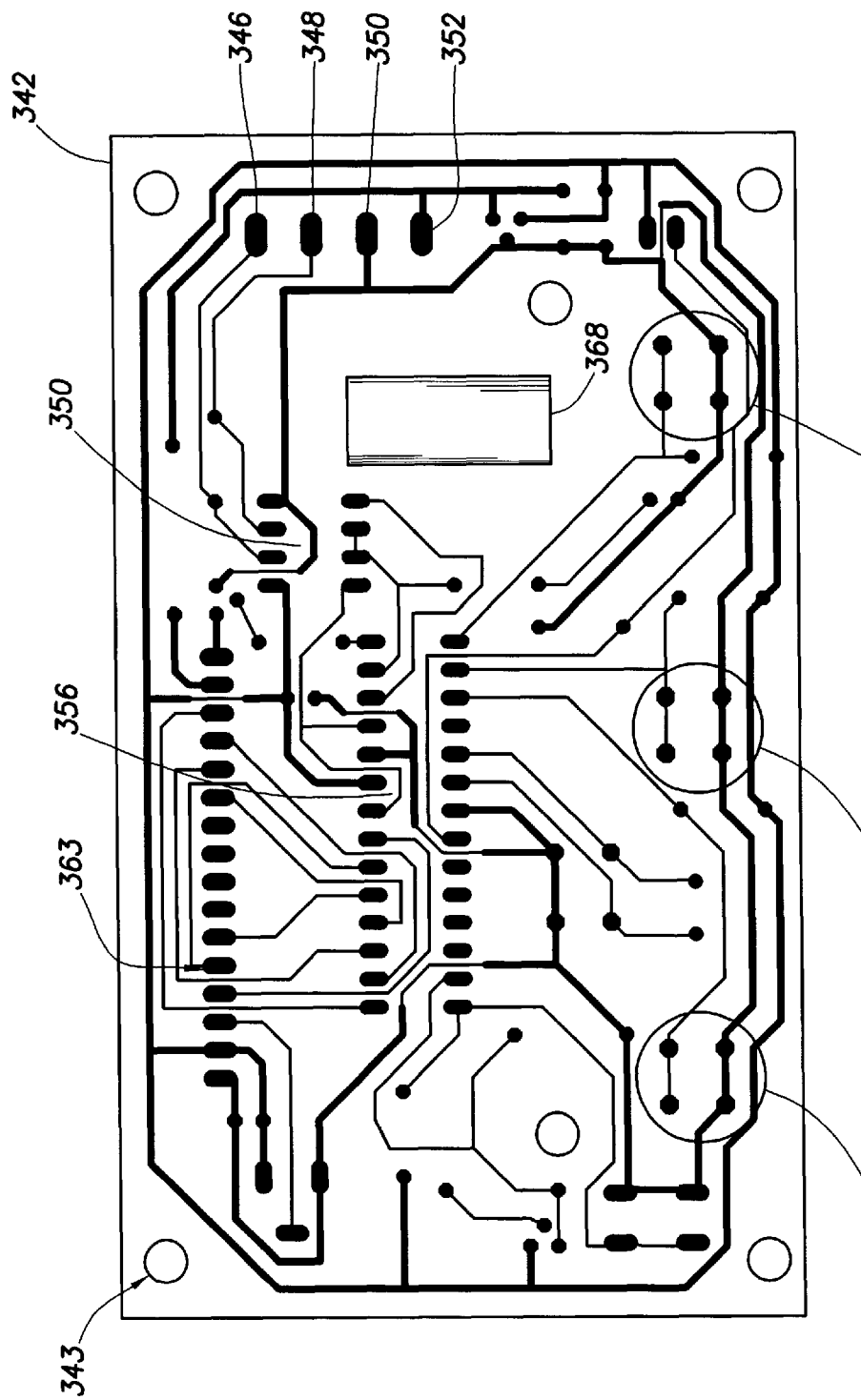
FIG. 12 is a schematic illustration of a circuit board for the thermostats that are located within individual thermal zones of a building space.
Figure 13:
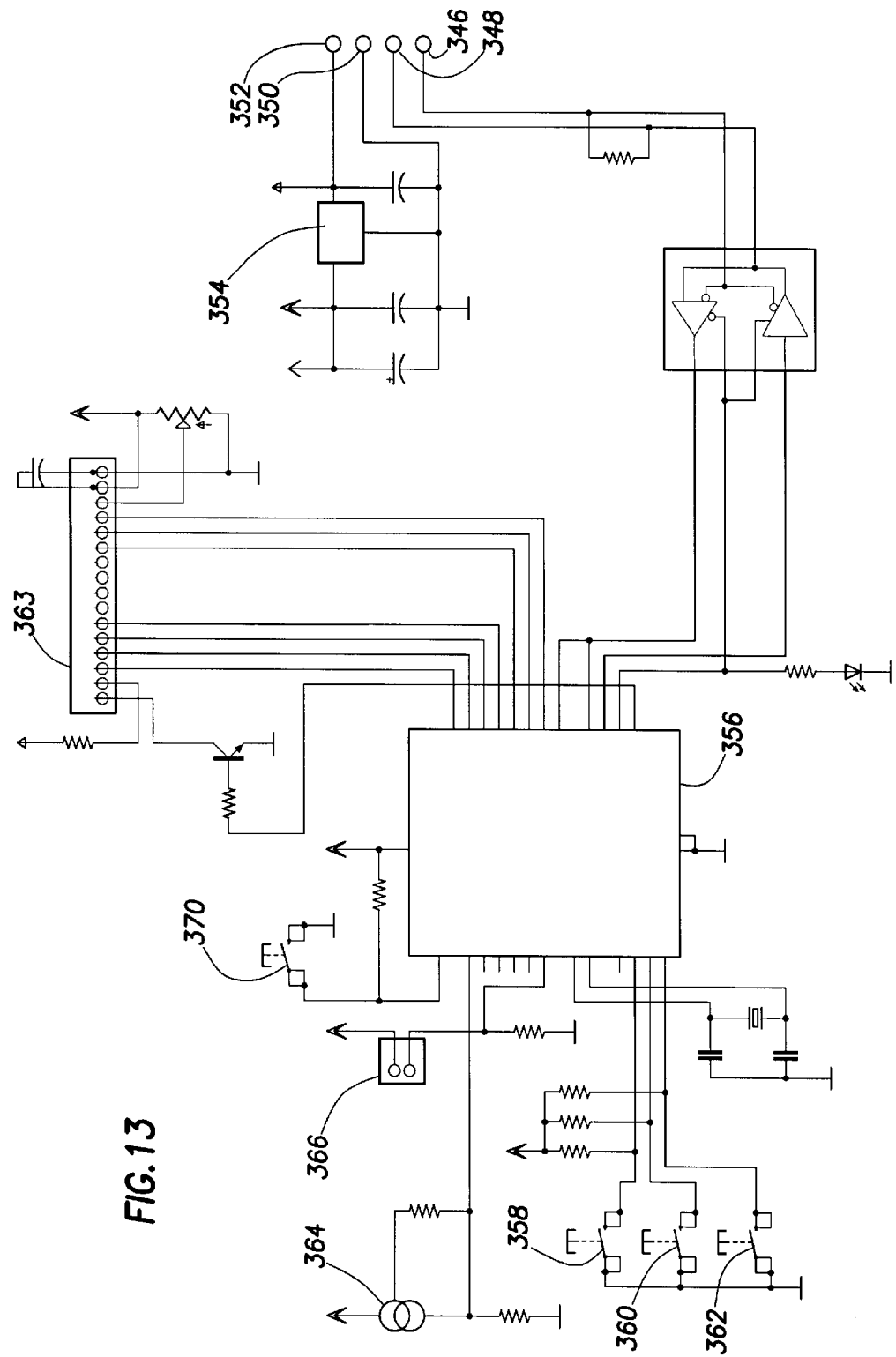
FIG. 13 is an electronic circuit schematic illustration of a thermostat that utilizes the printed circuit board of FIG. 10 as its mounting and circuit substrate.

Referring now to FIGS. 12 and 13, generally at 340, the electronic control circuitry of one of the thermal zone thermostats is shown as it appears on its printed circuit board 342. In FIG. 12 there is shown a printed circuit board of a thermostat that is located within an individual thermal zone of a building. The electronic schematic illustration of FIG. 13 illustrates the electronic thermostat circuitry that is mounted to the printed circuit board of FIG. 12. If the building has eight thermal zones, then eight thermostats will be provided, each being located in one of the thermal zones; each thermostat being selectively actuated by a person for selective control of the thermal conditions of that particular thermal zone of the building within which the thermostat is mounted.

The electronic circuitry of the individual thermostats are each mounted to printed circuit board 342 having screw holes 343, typically at its corners to provide for mounting of the circuitry to the wall structure of the building within a selected thermal zone. A terminal block 344 is mounted to the printed circuit board 342 and provides four connection terminals 346, 348, 350 and 352 for connection of four wires. These conductor wires are typically #AWG 18 solid copper insulated wires. Terminal block connections 346 and 348 provide for connection of two wires that are used for communication from the environmental control circuitry. The communications signal passes through the terminal block connectors 346 and 348 to the environmental control board or circuit for purposes of providing temperature settings, thermostat to thermostat interaction and for control of blowers, heat pumps, etc. Connectors 350 and 352 serve as connectors, respectively, for B and A conductors which connect with a circuit 354 which is referred to as an RS-485 circuit. Conductors of the circuit board that extend from terminal block connections 346 and 348 are common and 12 volt DC excitation conductors which are connected with a thermostat microprocessor chip 356. The thermostat circuitry includes control switch circuits 358, 360 and 362 which are button type contacts which are the points of interface for programming and configuring the thermostat and any other thermostat that is connected with the environmental control board or circuitry. Circuit 358 is a temperature "down" controller for lowering the temperature set point of the thermostat by an increment, such as a degree F each time the button is manually pressed by a person. Control switch button 360 is a "select" button for selecting the operational modes of the air-conditioning system, such as "cool", "heat", "fan" and "off" as it concerns the thermal zone in which the thermostat is located. The microprocessor 356 receives these commands, i.e., inputs, processes the signals and produces an output to terminals 346 and 348 and displays the selected mode, set points and temperatures on a display circuit 363. The thermostat circuitry has an onboard sensor 364 for sensing the temperature of the thermal zone at the thermostat and a remote sensor circuit 366 by which the thermostat circuitry may be used to control the temperature of a thermal zone where the thermostat is not located. The wires that are connected with the terminal block connectors 346, 348, 350 and 352 are routed through an opening 368 of the printed circuit board so that the terminal block connections may be made after the circuit board is mounted, without the wires being visible when the thermostat cover is attached to the circuit board. A "reset" circuit 370 also having a button type switch contact is connected with the microprocessor 356 and is used to configure the thermostat.

Figure 14:
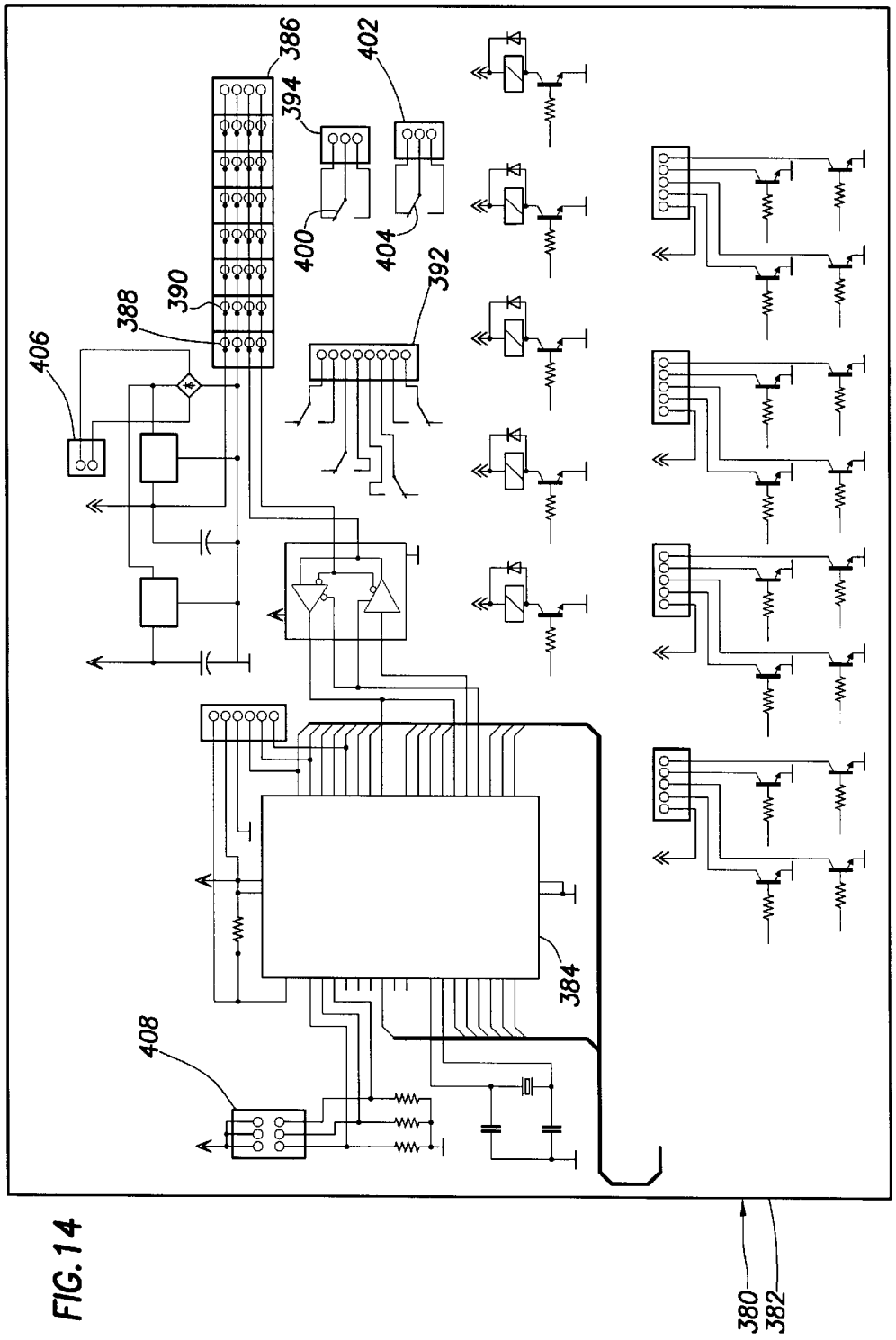
FIG. 14. is an electronic circuit schematic illustration showing the environmental control circuit board.
Figure 15:
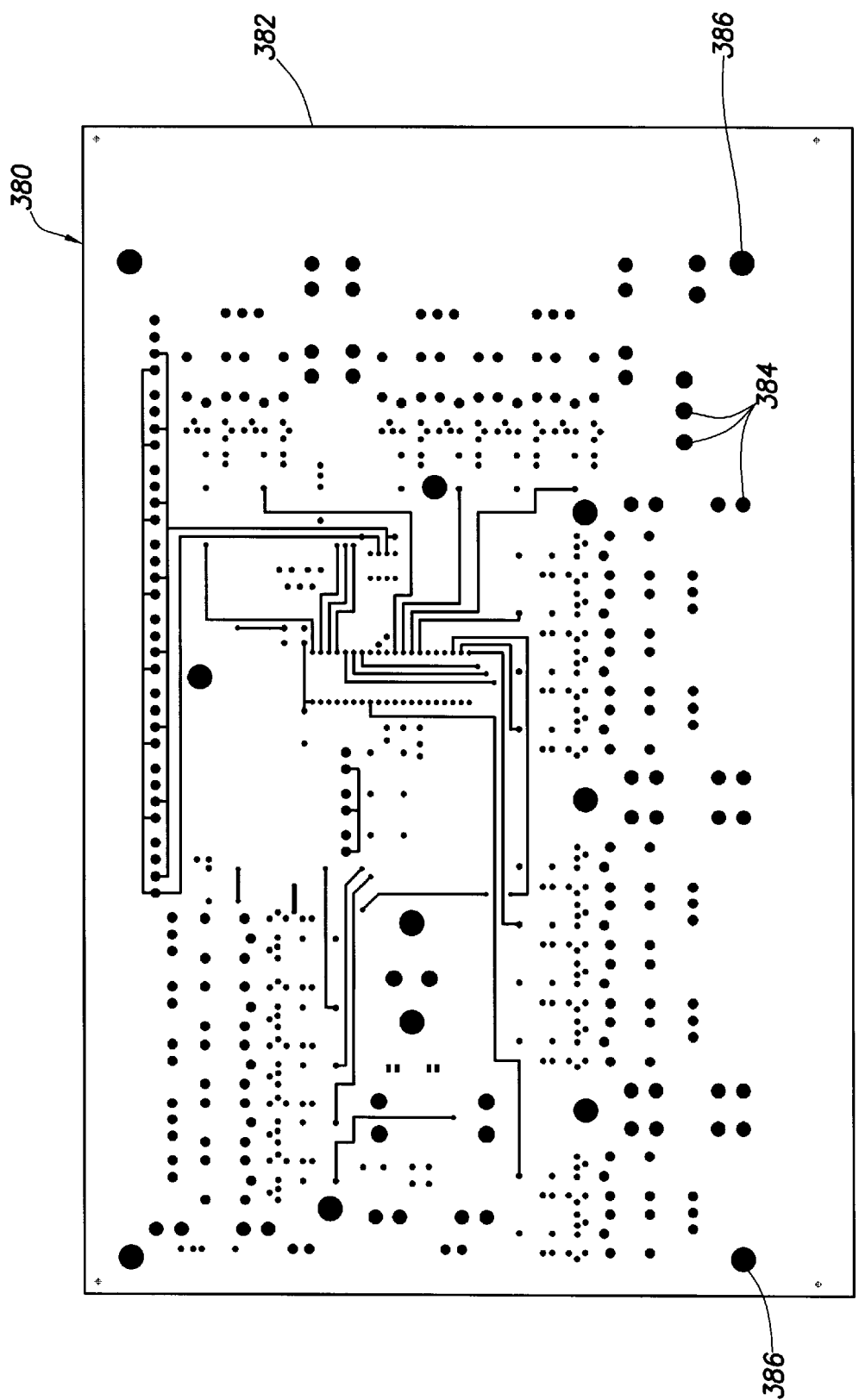
FIG. 15 is a diagrammatic illustration of the top of the printed circuit board layout for the electronic circuitry of the environmental control circuit board of FIG. 14.
Figure 16:
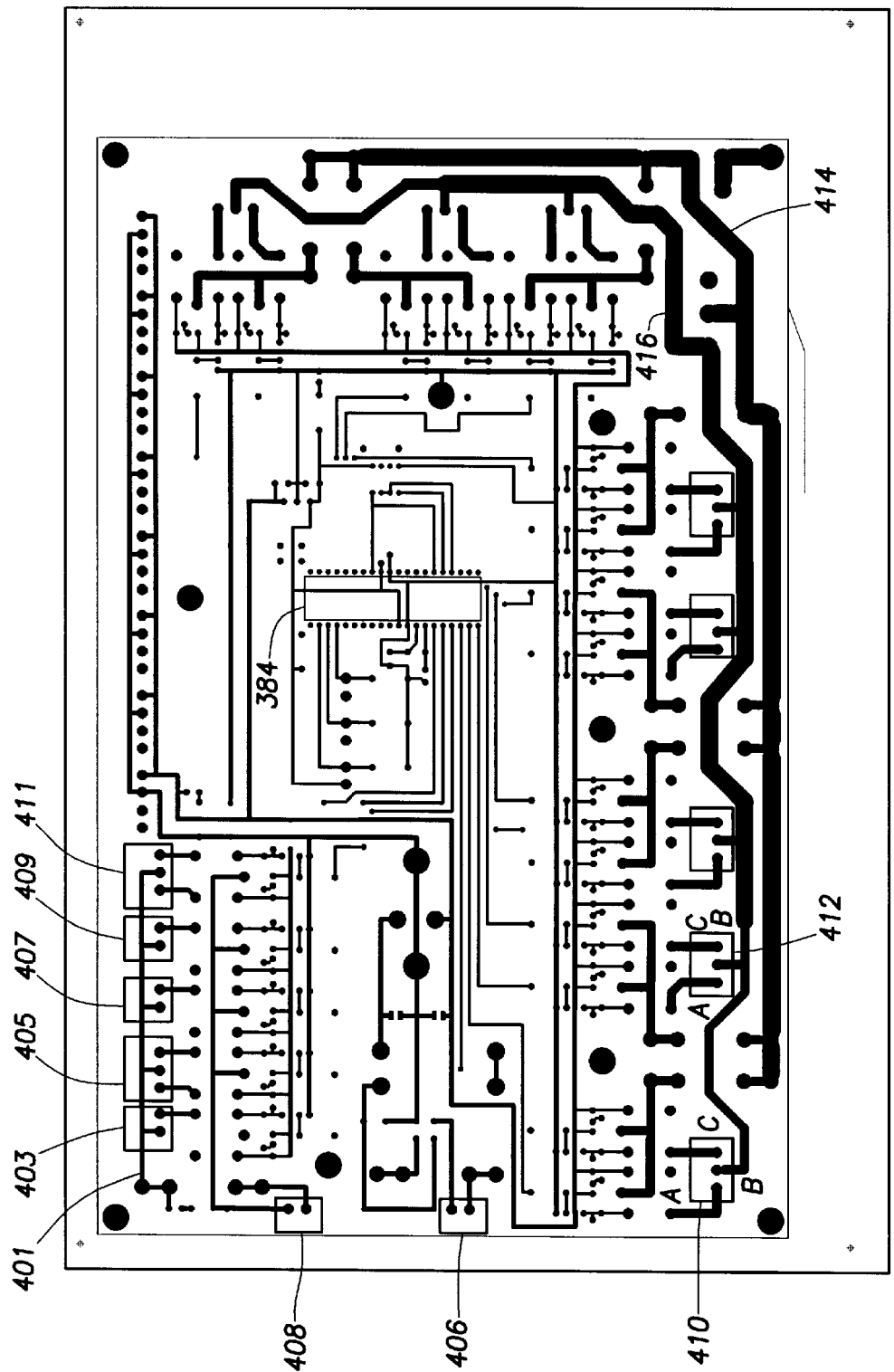
FIG. 16 is a diagrammatic illustration of the bottom of the printed circuit board layout for the electronic circuitry of the environmental control processor circuit board of FIG. 14.

FIG. 14 is an electronic schematic diagram showing the environmental control board or circuitry, shown generally at 380 and which is mounted to a printed circuit board 382. FIG. 15 is a circuit board illustration showing mounting holes 384 for circuit components and mounting screw holes 386 which receive screws for physically mounting the circuit board of the environmental control circuitry to a wall structure of a building, where it is easily viewed and physically accessed to permit inspection and operational control. The circuit board illustration of FIG. 15 also shows the major silk screen lettering and some of the conductor tracings of the board. FIG. 16 is an illustration of the printed circuit conductors of the circuit board of FIGS. 14 and 15. Referring now to FIG. 14, a microprocessor circuit or chip 384 is mounted to the circuit board 382. A terminal block 386 is also mounted to the circuit board and provides a plurality of sets of four terminals each, two sets of terminals being identified at 388 and 390. These sets of terminals are thermostat terminals which are provided for connecting conductor wires extending from the remote thermostats of typically eight thermal zones to the signal and control circuitry of the environmental control board. Typically, the four conductor wires will be connected with each of the four terminals of each terminal set and will extend to and will be connected with the terminal connectors 346, 348, 350 and 352 of one of the remote thermostat circuit boards as shown in FIG. 12. Circuit element 392 is a terminal block that is fixed to the circuit board 382 and represents the point where connections are made for 24 volt A/C excitation of specified equipment, i.e., first compressor, second compressor, heat strip and fan "ON", using 18 AWG solid copper insulated wire for terminal block connection. Circuit terminal 394 provides for external connection of a reversing valve. The circuits of terminal connectors 396 and 398 are normally open and normally closed, respectively. A switch element 400 is moved to open the normally closed circuit and to close the normally open circuit, thus actuating a reversing valve relay. Circuit terminal 402 is also a reversing valve control circuit of similar nature, having a switch 404 for actuating a reversing valve relay.

The microprocessor 384 is programmed with firmware for the environmental control board sequence of operations, or it uses the feedback from the thermostats to cycle the relays, excite certain points, etc. to effect cooling and heating, fan operation, or to turn the system on or off. The microprocessor is also provided with a storage memory which function as a volitile memory which receives and stores data such as thermostat set points. Terminal blocks 406 and 408 establish points of connection where 24 volts AC is delivered to the circuit board of the environmental control processor circuitry responsive to closing of power control relays that are mounted to the terminal blocks.

Referring to FIG. 16, which shows the printed circuit board diagram of the environmental control circuitry, a plurality of zone blower relays are provided, as shown at 410 and 412 each relay controlling energization of the two speed motor of a zone blower, so that the blower operates at a high speed or a low speed responsive to speed control signals of the circuit microprocessor. When the zone thermostat of a particular thermal zone is one degree out of set point, the microprocessor of the environmental control circuitry of FIGS. 14–16 provides a control signal that engages a relay, such as 410 to turn on power to the terminals 410A and 410B for low speed blower motor operation. Likewise, if the zone temperature being sensed by any particular zone thermostat is two degrees or more out of set point, the relay 410 will turn on power to the terminals 410A and 410C to achieve blower motor operation at high speed. High speed blower motor operation will then continue until such time as the sensed temperature within the thermal zone has returned to one degree out of set point, at which time the microprocessor again signals the relay to return to its low speed setting. When the thermostat set point has been reached, the microprocessor will signal the relay to be deenergized, thus turning the fan power control circuit off and stopping the blower for that particular thermal zone. The heavier printed circuit conductors 414 and 416 of the environmental control processor circuitry are designed to accommodate 230 volt AC electrical current for the various blower motor circuits which are activated or deactivated by respective relay positioning in response to control signals of the microprocessor 384.

As shown at the upper left-hand corner of the printed circuit diagram of FIG. 16, a plurality of circuit control relays are mounted to the circuit board and are selectively responsive to microprocessor signals to open or close circuits that arte powered from a power conductor 401 having a 24 volt AC voltage. Relay 403, when closed, activates a heat strip circuit causing resistance heating of a heat strip for addition of heat to the conditioned air in the event the heat pumps are not capable of sufficient heat output to maintain all of the thermostats at their selected set points. Relay 403, when closed responsive to microprocessor signals, energizes a reversing valve circuit for selectively positioning a first reversing valve. A second reversing valve relay 411 is closed to energize a power circuit for a second reversing valve. First and second compressor relays 407 and 409 are selectively closed to energize compressor power circuits to energize the electric motors of first and second heat pumps. It should be borne in mind that one of the compressor relays will typically be closed at low heat load and both compressor relays will be closed when the head load is greater than can be efficiently satisfied by the first compressor, thus causing both heat pumps to operate simultaneously. It should also be noted that the primary and secondary heat pumps are periodically reversed so that heat pump wear is substantially even.

Figure 17:
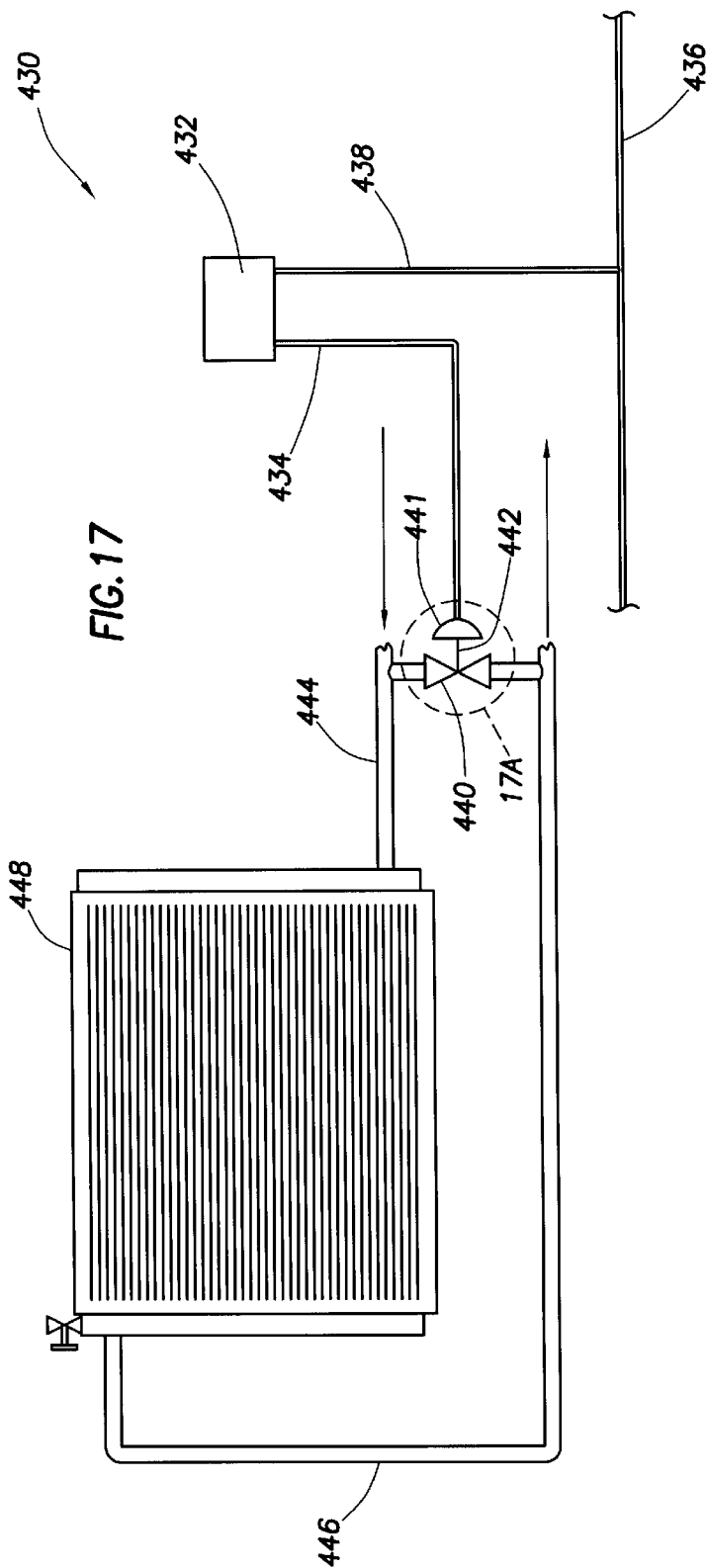
FIG. 17 is a schematic illustration of pneumatic control circuitry and a portion of a chilled or hot water circuit illustrating control of hot and chilled water selection and flow by means of a pneumatic control system.
Figure 17A:
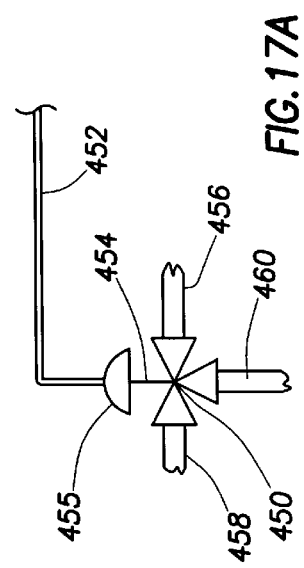

With reference to FIG. 17, it is intended that the chilled and hot water air-conditioning system embodiments discussed above may be controlled by a pneumatic control system if desired. A pneumatic control system is shown generally at 430 and includes a pneumatic thermostat 432. The thermostat has one or more pneumatic signal lines such as shown at 434 which provide one or more pneumatic thermostat output signals in the range of about 3–15 psig. A pneumatic supply line 436 extends from a source which provides a dry pneumatic air or other suitable gas at a predetermined pressure or pressure range, such as about 15–25 psig for example and branch supply lines 438 extend from the pneumatic supply line to the pneumatic thermostat which is located to sense the temperature of the conditioned air chamber and, if the temperature is above the set point, the pneumatic thermostat will output a control signal to the two-way or three-way water control valve 440 to regulate the position of the valve stem 442 of the valve and thus increase the chilled water flow through the inlet line 444 and outlet line 446 of the water coil 448. It should be noted that the water coil can be substantially identical in chilled water and hot water heat exchanger systems. When a three-way pneumatically controlled valve is employed such as shown at 450 a thermostat signal line 452 from the pneumatic thermostat 432 is utilized to control the position of the valve stem 454 for controlling the flow of water from a chiller or boiler through a water inlet line 456, a water outlet line 458 to the water coil and a water by-pass line 460, thus controlling the volume of water flow through the water coil and thus controlling the thermal interchange from the water coil to air being blown through the water coil. The variance between the temperature of the conditioned air chamber and the thermostat setting will determine the amount of signal sent to the control valve head 441 or 455 or both. The pneumatic thermostat can be direct acting or reverse acting. If direct acting, a temperature rise in cooling mode increases the output signal. The opposite is true for the reverse acting mode. In the heating mode, a falling temperature signifying a demand for additional heating will position the pneumatic control valve to allow additional water to flow through the water coil until the temperature of the air within the conditioned air chamber is increased and the set point thermostat is satisfied.

FIG. 17 is thus a schematic illustration showing a chilled or heated water coil for an air conditioning system having pneumatic controls for the thermal zone demand system. When pneumatic controls are utilized to control the operations of the thermal demand cascade arranged unit, the schematic of FIG. 17 shows how to connect the pneumatic tubing. There exists a supply of control air, which is usually 15–25 psig. This control air supply is piped to the pneumatic thermostat 432. The thermostat senses the condition of the chamber and if the temperature is above the set point, the pneumatic thermostat will output a signal to the 2 way valve (or 3 way valve) to regulate the position of the valve stem to change the volume of water flow and thus satisfy the cooling load. The variance between the temperature of the conditioned chamber and the thermostat setting will determine the amount of signal sent to the control valve head. The thermostat can be direct acting or reverse acting. If direct acting, a temperature rise in cooling mode increases the output signal. The opposite is true for reverse acting. In the heating mode, a falling temperature signifying a demand for heating will position the valve to allow water to fall to the coil until the chamber is heated and the thermostat is satisfied.

To facilitate a system diagnostic which is required for start-up, the following procedure is followed:

ECP Diagnostic Procedure

Test Setup

1. Except for the burn-in test, these diagnostics may be run "on the bench," or in an installed system.
2. Visually inspect the ECP Board. Replace it if anything is damaged or missing.
   Inspect the connections and fix any that is not right.
3. Attach the Diagnostics Pushbutton[1] (DPB) to the Diagnostics connector (formerly the outside temperature probe).

If a DPB is not available, any momentary push button with pigtails will suffice.

4. Apply power to the ECP Board.
5. Press and hold DPB while pressing the reset button.
6. Release DPB. The system is now in diagnostics mode.

Pre-test Check

7. Observe all relay LEDs.
   a. All OFF: OK, proceed to the next step.
   b. All ON: Replace IC1.
   c. Some ON, some OFF: Replace ECP Board. (First, be sure the DPB didn't accidentally bounce and skip to the Zone Relays test.)
8. Using a meter, ensure all the relay outputs are inactive (except for the N.C. side of the Reversing Valve relays). A closed relay indicates the relay is bad. Replace the ECP board.

Zone Relays

9. For each Zone, press and release DPB. First the low-speed relay will activate, then the high-speed relay will activate for each zone. Observe the LEDs and measure the output for each relay. If the system is installed, this step can also be used to ensure that the zone fans are correctly installed and in their correct order by zone.
   a. If an LED fails to glow, or a relay fails to close, replace the ECP board.
   b. One and only one relay should close at a time. If multiple relays close during this test, replace the ECP Board.

Compressor and Reversing Valve Relays, and Evaporator Temperature Probes

10. Press and release the DPB. This will activate the Compressor relay.
11. Observe the Compressor LED and measure the output of the relay.
    a. If the LED fails to glow, or the relay fails to close, replace the ECP Board.
12. Observe the Zone Low- and High-speed relays.
    a. Both ON: OK, proceed to the next step.
    b. Low-speed only ON: Probe is measuring a temperature below the lower set point (about 40 F.).
    c. High-speed only ON: Probe is measuring a temperature above the upper set point (about 120 F.).
    d. Flashing: The Evaporator probe is inserted backwards or bad. Reverse the probe wires. If the Zone relays continue flashing, replace the probe with a known good probe. If the Zone relays continue flashing with a good probe, replace the ECP Board.
    e. Both OFF: The Evaporator probe is missing, or bad. Install a known good probe.
13. Press and release the DPB. This will also activate the Reversing Valve relay.
14. Observe the Compressor and Reversing Valve LEDs and measure the output of the Reversing Valve relay.
    a. If the LED fails to glow, or the relay fails to close, replace the ECP Board.
15. Repeat the steps 10 to 14 for both compressors.

Auxiliary Heat Relay

16. Press and release the DPB. This will activate the Aux Heat relay.
17. Observe the Aux LED and measure the output of the relay.
    a. If the LED fails to glow, or the relay fails to close, replace the ECP Board.

Fan-on Relay

18. Press and release the DPB. This will activate the Fan-on relay.
19. Observe the Fan On LED and measure the output of the relay.
    a. If the LED fails to glow, or the relay fails to close, replace the ECP Board.

Thermostat Communications

20. Press and release the, DPB. This will start the Thermostat Communications test.
21. Wait one minute and observe the fan relays for each zone.
    a. OFF: No thermosiat is currently detected for this zone.
    b. Low-speed only ON: A thermostat was detected, but is no longer available.
       Thermostats may be mostly "Both ON", and occasionally transition to "Low-speed only ON" briefly. This is normal.
    c. High-speed only ON: The thermostat for this zone is available, but has detected an internal fault. Replace the thermostat.
    d. Both ON: The thermostat for this zone is fully functioning.
22. If thermostats are connected but none are reported, check the wiring for each thermostat at the ECP Board and at the thermostat. If that doesn't repair the problem, replace IC2 on the ECP Board
23. If some thermostats work and others do not, check the wiring and check the zone number configuration for each thermostat.

Burn-in Test

WARNING: This diagnostic cycles all relays on simultaneously! This can damage equipment. Remove power from the all fans and compressor relays before running this test. The Burn-in Test is primarily intended for bench testing.

24. Press and release the DPB three times. This will start the Burn-in test.
25. Observe the burn-in test diagnostics.
    a. Cycle all relays for about 1 minute.

b. Turn on all relays for about 10 minutes.
c. Repeat indefinitely.
d. Note that all the relays not closing, or erratic system behavior could be caused by an underrated power supply transformer.

Thermostat Features:
Designed exclusively for the Cascade Energy System Digital Controller
Only four wires to connect
Supports two to eight zones
Control any zone from any thermostat
Easy to use three button control
32 character user-friendly display
Backlighted display
Temperature adjustable from 45° to 90° Fahrenheit
Accurate within ±1° F.
Adjustable temperature sensor
Independent temperature settings for heating and cooling
Buttons can be disabled
Automatic heating switchover with 40° F. outside temperature
Automatic heating shutdown if temperature exceeds 90° F.
Settings are permanently saved—no battery back-up required
Alternate compressors for more even wear and quicker response
Parts of the Model CES-1000 Thermostat
The CES-1000 consists of a base, cover, circuit board, display, and three buttons.

Display

During normal operation, the display shows the Zone, Name, Current Temperature, Thermostat Setting, System Mode, and Status.

When configuring the CES-1000, the display is different. The top line of the display shows the configuration option to change, and the bottom line shows the instructions of what to do.

FIG. 2—Option Configuration Display

Buttons

The CES-1000 thermostat has four buttons to access all its features. These are the Down, Enter, and Up buttons. The Enter button is used to select a zone, or a setting to change. The Down and Up buttons are used to change the temperature, or settings. Briefly touch any button to turn on the display backlight only. To change a system setting, press and hold the Enter button for 5 seconds. Press all three buttons simultaneously to reset the system.

Installing the Model CES-1000 Thermostat

Note: these instructions assume the Cascade Energy Systems Main Unit and Environment Control Board are already properly installed. Refer to those respective manuals for more information.

Warning: the model CES-1000 thermostat must only be connected to a Cascade Energy Systems Environment Control Board in accordance with these instructions. Connecting it incorrectly or to any other device will void the warranty.

If this is a new installation, we recommend using twisted-pair shielded cable.

Mount the model CES-1000 thermostat 4 to 5 feet above the floor. Do not install it behind a door, in a corner, near air vents, in direct sunlight, or near any heat generating devices. Do not install it in an area where it will get wet.

Connect power to terminals 1 and 2.

Connect the black wire to terminal 3, and the red wire to terminal 4. If you are using shielded cable, do not connect the shield drain wire anywhere to the model CES-1000 thermostat. Replace the cover.

Determine which zone this thermostat will service. Connect the other end of the wire to the Cascade Energy System Digital Control Board for that zone. Only one thermostat may be connected for each zone. Connect the black wire to the (−) terminal, and the red wire to the (+) terminal. If you are using shielded cable, connect the shield drain wire to a green-wire ground in the Cascade Energy Systems Main Unit.

Configuring the Model CES-1000 Thermostat

After installing the CES-1000, it needs to be configured. At a minimum, the zone number must be configured for each thermostat in a system.

Option configurations are accessed by following these steps:

Press and hold the Enter button for at least 5 seconds until the display reads, Select an Option. Release the Enter button. The top line of the display shows the option, and the bottom line shows Up/Dn ENTER.

Use the Up and Down buttons to select an option to change.

Press Enter to choose the option. The top line of the display now shows the option value, and the bottom line shows Up/Dn ENTER.

Use the Up and Down buttons to change the setting for the selected option.

Press Enter to save the setting of the selected option and return to the normal display, or wait 15 seconds to cancel the changes.

TABLE 1

Option Quick Reference

| Option | Values | Action |
| --- | --- | --- |
| Configure Zone | 1 to 8 | Configure the zone number for this thermostat |
| Select Zone Name | Room Names | Choose a name for this thermostat |
| Set System Mode | Off, Heat, Cool, or Fans | Set the current system mode |
| Enable Buttons | Yes or No | Enable or disable the buttons on another thermostat |
| Degrees C. or F. | Fahrenheit or Celcius | Change the temperature display conversion |
| Adjust Temp | Up or Down | Adjust the temperature probe reading |

Configuring the Zone Number

Press and hold the Enter button for at least 5 seconds until the display reads, Select an Option. Release the Enter button. The display will change.

Press the Enter button to set the zone number for this thermostat. The display wil change.

Use the Up and Down buttons to select the correct zone for this thermostat. The zone number will increase and decrease accordingly.

When the correct zone number appears, press the Enter button.

The zone name for this thermostat will default to the zone number.

Configuring the Zone Name

Press and hold the Enter button for at least 5 seconds until the display reads, Select an Option. Release the Enter button. Press the Down button to find the Select Zone Name option. The display will change.

Press the Enter button to set the zone number for this thermostat. The display will change.

Use the Up and Down buttons to select a name for this thermostat. Refer to Table 2 for the list of names.

TABLE 2

Zone Names

| | | | |
|---|---|---|---|
| Living Room | Family Room | Game Room | Den |
| Theater Room | Study | Library | Dining Room |
| Kitchen | Utility Room | Laundry Room | Master Bedroom |
| Master Bath | Master Closet | Front Bedroom | Back Bedroom |
| Entry | Basement | Workshop | Zone One |
| Zone Two | Zone Three | Zone Four | Zone Five |
| Zone Six | Zone Seven | Zone Eight | |

When the desired zone name appears, press the Enter button.

Configuring the System Mode

Press and hold the Enter button for at least 5 seconds until the display reads, Select an Option. Release the Enter button. Press the Down button to find the Set System Mode option. The display will change.

Press the Enter button to set the Heat or Cool Mode for the system. The display will change.

Use the Up and Down buttons to select the system mode. When the desired mode appears, press the Enter button.

Disabling Buttons on a Thermostat

Note: You cannot disable a thermostat's own buttons.

Press Enter to select another zone thermostat to enable or disable.

Press and hold the Enter button for at least 5 seconds until the display reads, Select an Option. Release the Enter button. Press the Down button to find the Enable Buttons option. The display will change.

Press the Enter button to set the Heat or Cool Mode for the system. The display will change.

Press the Up button to enable and Down button to disable. When the desired mode appears, press the Enter button.

Operating the Model CES-1000 Thermostat

During normal operation, the display shows the Zone Name, Current Temperature, Thermostat Setting, System Mode, and Status.

To change the temperature setting of the present zone, press the Down and Up buttons to the desired temperature. To change the temperature setting of another zone, press the Enter button to find the zone, and then press the Down and Up buttons to the desired temperature. Note: When reading the settings on another zone, the current temperature display briefly reads 99.9 while the correct current temperature is being fetched. The temperature setting in the heat mode should not exceed the cooling mode temperature setting. Conversely, the cooling mode temperature setting should not be set below the heating temperature setting.

To protect the compressor units, the Cascade Energy System has a feature that it will not attempt to cool when the outside temperature is below 40° F. Neither will it attempt to heat a room above 90° F.

To change the System Mode, refer to the section titled Configuring the System Mode.

To reset the system, press Up, Down, and Enter. To reset only one thermostat, remove the cover and press the internal reset button. To erase the settings for a thermostat, press the Up and Down buttons while the thennostat is resetting. Then press the Enter button to erase the thermostat settings. The zone number will need to be reconfigured.

Troubleshooting Guide

| Problem | Probable Cause | Remedy |
|---|---|---|
| Something is wrong | System needs to be reset | Press all three buttons on a thermostat to reset the system. Remove the cover to press the internal reset button on a thermostat. |
| Display is blank, jittery, or scrambled | Wire is loose, broken, or not connected; Thermostat is faulty; Environment Control Board (ECB) is faulty, or not powered | Check wires and power to the thermostat and the ECB; If the thermostat can be accessed from another CES-1000, replace thermostat; Replace ECB; Use twisted pair shielded cable. |
| The above remedies do not fix a thermostat | Need to reset the thermostat settings | Press and hold the Up and Down buttons while resetting the thermostat. Press Enter to completely reset the thermostat settings. Reprogram the zone number for this thermostat. |
| Buttons don't work, only the backlight illuminates | The buttons have been disabled from another thermostat | From another CES-1000 in the system, ensure the "Enable Buttons" option is enabled for this thermostat |
| Settings mysteriously change | Someone is changing settings from another thermostat | Disable the buttons on the other thermostat (see section Disabling Buttons on a Thermostat) |
| I'm unable to reach a thermostat while reviewing settings on other zones. | Someone is reviewing settings on other zones from the missing zone. | Wait for the other zone to become available. |
| Thermostat says it should be running, but the compressor and fan are off | To protect the compressors, they cannot be restarted until after a 5 minute delay | Wait 5 minutes for compressor to restart |
| System will not work or stay in cool mode | To protect the compressors, the system will not cool when the outside temperature is below 40°; Outside | Wait for the outside temperature to increase; Connect or replace Outside Temperature Sensor |

-continued

Troubleshooting Guide

| Problem | Probable Cause | Remedy |
| --- | --- | --- |
| In heat mode, the system shuts off at 90° F. | Temperature Sensor is not connected or faulty To protect the compressors, the system will not attempt to heat above 90° | Get a space heater for areas that need to be hotter than 90° |
| The thermostat display is on, but it doesn't seem to control properly; Other thermostats can't access it | The zone number is not set; Two or more thermostats are attempting to use the same zone number | Set the zone number; Ensure each thermostat is assigned a unique zone number |
| The thermostat won't allow temperature settings above or below a certain setting | The system only allows temperature settings between 45° and 90° F.; The heating temperature cannot be set above the cooling setting; The cooling temperature cannot be set below the heating setting | Adjust the temperatures between 45° and 90° F.; Raise the cooling, or lower the heating temperature settings respectively so the heating or cooling temperature can then be set higher or lower |

In view of the foregoing, it is evident that the present CES invention is one well adapted to attain all of the objects and features hereinabove set forth, together with other objects and features which are inherent in the apparatus disclosed herein.

As will be readily apparent to those skilled in the art, the present CES invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

We claim:

1. A thermal zone demand controlled air conditioning system for heating and cooling the air of a building space having a plurality of thermal zones, comprising:
   an air circulation system for circulating air to and from said thermal zones and having a conditioned air chamber and a plurality of conditioned air supply conduits each being in communication with said conditioned air chamber and being in conditioned air supplying relation with a respective one of said thermal zones of the building space;
   a plurality of sources of heating and cooling being located externally of said building space and having first and second heat exchangers located in series within said air circulation system and being connected in thermal exchange circulating relation respectively with said plurality of sources of heating and cooling and selectively heating and cooling air flowing to said conditioned air chamber;
   a plurality of thermal zone blowers each having a multi-speed electric blower motor and being in communication with said conditioned air chamber and with respective conditioned air supply conduits and being connected in said air circulation system and conducting conditioned air from said conditioned air chamber through respective air supply conduits to respective thermal zones of said building space;
   a dc control power supply circuit and an ac power supply circuit;
   a plurality of thermal zone blower circuits each being operationally connected to respective multi-speed electric motors of said thermal zone blowers for control by said dc control power supply circuit, each of said zone blower circuits having multi-speed electric motor control devices controlling blower motor operation and speed by said ac power supply circuit;
   a plurality of thermostats each being located within a respective thermal zone of said building space and being electronically connected with said dc control power supply of said electronic controller circuitry and having respective low and high temperature signal conductors being energized at respective low and high predetermined temperatures; and
   electronic controller circuitry being coupled for sensed thermal demand control of said plurality of sources of heating and cooling and for control of said plurality of multi-speed electric blower motors of said thermal zone blowers for operation of one of said plurality of sources of heating and cooling to accommodate a predetermined range of thermal load and for operation of at least one other of said plurality of sources of heating and cooling to accommodate a range of thermal load in excess of said predetermined range of thermal load and for selective operation of said plurality of thermal zone blowers responsive to sensed conditions of thermal load of said plurality of thermal zones.

2. The thermal zone demand controlled air conditioning system of claim 1, comprising:
   said plurality of sources of heating and cooling being first and second cascade arranged heat pumps located externally of said building space and having a coil unit having first and second refrigerant coils located in series within said air circulation system and being connected in refrigerant circulating relation respectively with said first and second heat pumps and selectively heating and cooling air flowing to said conditioned air chamber.

3. The thermal zone demand controlled air conditioning system of claim 2, wherein said coil unit comprises:
   a coil housing being connected in said air circulation system for receiving return air from said plurality of thermal zones of said building and directing circulating air to said conditioned air chamber;
   said first and second refrigerant coils being located in series within said coil housing; and said first and second refrigerant coils each-having refrigerant supply and return lines being in communication therewith.

4. The thermal zone demand controlled air conditioning system of claim 1, comprising:

a coil unit having a coil housing being connected in said air circulation system and receiving return air from said plurality of thermal zones of said building;

a plurality of water coils being located in series within said coil housing; and said plurality of thermal sources being a plurality of water chiller units and water heating units and each having water supply and return lines being in communication with said plurality of water coils.

5. The thermal zone demand controlled air conditioning system of claim 1, comprising:

said plurality of sources of heating and cooling each being a chilled water system for providing cooling to circulating air through heat exchanger coil and each having an air side electric resistance heating element selectively heating air flowing to said conditioned air chamber.

6. The thermal zone demand controlled air conditioning system of claim 1, comprising:

a chilled water system having a fin and tube heat exchanger coil of multiple row in depth providing cooling of water;

a hot water system providing heating of water through a fin and tube heat exchanger of multiple row in depth; and a thermal demand responsive electronic system controller for controlling selective activation of said chilled water system and said hot water system for heating and cooling the air of said plurality of thermal zones of said building space responsive to individually sensed thermal demand of said plurality of thermal zones.

7. The thermal zone demand controlled air conditioning system of claim 1, comprising:

said plurality of sources of heating and cooling having external to the building space a plurality of packaged chillers each having a chilled water coil located in said air circulation system and cooling and circulating water in a closed water circulation loop to and from the chilled water coil and said plurality of packaged chillers each being independently operated according to thermal demand of said plurality of thermal zones and cooling air flowing to said conditioned air chamber.

8. The thermal zone demand controlled air conditioning system of claim 1, comprising:

said plurality of sources of heating and cooling being a packaged water chiller device and a packaged water heater device both being located external to the building space;

said packaged water chiller device having a closed chilled water circulation loop defining a two pipe circuit and having a chilled water coil being located in said air circulation system and selectively cooling and circulating water in said closed water circulation loop to and from said chilled water coil and cooling air flowing through said chilled water coil to said conditioned air chamber;

said packaged water heating device having a closed heated water circulation loop defining a two pipe circuit and having a heated water coil being located in said air circulation system and in series with said chilled water coil and selectively heating and circulating water to and from the heated water coil and heating air flowing through said heated water coil to said conditioned air chamber.

9. The thermal zone demand controlled air conditioning system of claim 1, comprising:

said plurality of sources of heating and cooling being external to the building space both a packaged water chiller device and a packaged water heating device;

a closed two pipe water circulating loop connected with said water coil and circulating the water in a closed water circulation loop to and from the water coil; and at least one connection device selectively connecting said two pipe water circulating loop with said packaged water heating device for circulating heated water in a closed loop to and from the water coil and heating air flowing to said conditioned chamber and selectively connecting said two pipe water circulating loop with said packaged water chiller device for circulating chilled water in a closed loop to and from the water coil and heating air flowing to said conditioned chamber for cooling air flowing through said conditioned air chamber.

10. The thermal zone demand controlled air conditioning system of claim 1, comprising:

said water coils being at least one chilled water coil and at least one hot water coil;

said plurality of sources of heating and cooling being external to the building space both a packaged chiller device selectively cooling water and a packaged water heating device selectively heating water;

a first closed chilled water circulating loop connected with said chilled water coil and circulating the water in said water circulation loop to and from the chilled water coil and cooling air flowing to said conditioned chamber; and a second closed loop hot water circulating loop connected with said packaged water heating device and circulating heated water to and from the hot water coil and heating air flowing to said conditioned chamber, where the water circulates in a two pipe circuit.

11. The thermal zone demand controlled air conditioning system of claim 10, comprising:

said chilled water flowing in a separate and distinct two pipe chilled water circuit and said hot water flowing in a separate and distinct two pipe circuit.

12. The thermal zone demand controlled air conditioning system of claim 1, wherein said air circulation system comprises:

a coil unit being located within said air circulation system;

first and second heat exchangers being located within said coil unit and having heat exchanging connection with said plurality of sources of heating and cooling;

a conditioned air housing defining a conditioned air chamber in communication with said coil unit and receiving conditioned air flowing through said first and second heat exchangers;

said plurality of thermal zone blowers being mounted to said conditioned air housing and having conditioned air supplying communication with said plurality of conditioned air supply conduits; and said electronic controller circuitry selectively operating said plurality of thermal zone blowers at blower speeds determined by the individual thermal demand of said plurality of thermal zones.

13. The thermal zone demand controlled air conditioning system of claim 12, comprising:
   electric motors driving each of said plurality of thermal zone blowers and being multi tapped motors with multiple motor speeds.

14. The thermal zone demand controlled air conditioning system of claim 12, comprising:
   electric motors driving each of said plurality of thermal zone blowers and being variable frequency drive motors with multiple motor speeds.

15. The thermal zone demand controlled air conditioning system of claim 1, comprising:
   said environmental control circuitry being digital electronic control circuitry and being connecting in controlling relation with said plurality of sources of heating and cooling and with said plurality of thermal zone blowers for selective operation thereof responsive to thermal load of said plurality of thermal zones.

16. The thermal zone demand controlled air conditioning system of claim 1, comprising:
   said environmental control circuitry being pneumatic control circuitry and being connecting in controlling relation with said plurality of sources of heating and cooling and with said plurality of thermal zone blowers for selective operation thereof responsive to thermal load of said plurality of thermal zones.

17. The thermal zone demand controlled air conditioning system of claim 1, wherein said air circulation system comprises:
   a return air housing defining an air return chamber and a conditioned air chamber;
   said first and second heat exchangers being fluid conducting heat exchange coils collectively defining an air flow and conditioning partition through which return air flows from said air return chamber to said conditioned air chamber and accomplishing heat transfer to or from either of said heat exchange coils;
   a return air plenum for receiving return air from said thermal zones;
   a return air blower being connected to said return air plenum and forcing return air from said return air plenum into said return air chamber and through said first and second heat exchange coils; and
   said plurality of thermal zone blowers being connected to said housing and each being in communication with said conditioned air housing and having respective electric motors being independently operable by said electronic control circuitry and independently supplying conditioned air from said conditioned air chamber through respective air supply conduits to respective thermal zones.

18. The thermal zone demand controlled air conditioning system of claim 17, wherein:
   said heat exchange coils being refrigerant coils; and
   said plurality of sources of heating and cooling being first and second heat pumps;
   said electronic controller circuitry having an environmental control circuit and a plurality of electronic thermostats each being located within one of said thermal zones and each being connected with said environmental control circuit and a microprocessor receiving temperature responsive signals from said plurality of electronic thermostats and controlling operation and operating speed of said plurality of thermal zone blowers.

19. The thermal zone demand controlled air conditioning system of claim 17, wherein:
   said heat exchange coils being water coils arranged in series within said air return chamber; and
   said plurality of sources of heating and cooling being at least one water chiller device having a chilled water coil being located within said return air chamber and at least one water heater device having a heated water coil being located within said return air chamber and being located in series with said chilled water coil;
   a water circulation system having at least one pump and at least one reversing valve selectively controlling water flow in said water circulation system and through said chilled and heated water coils; and
   said electronic control circuitry having an environmental control circuit and having a plurality of electronic thermostats each being located within one of said thermal zones and each being connected with said environmental control circuit, said environmental control circuit having a microprocessor receiving temperature responsive signals from said plurality of electronic thermostats and controlling operation and operating speed of said plurality of thermal zone blowers and said return air blower, controlling energization of said at least one pump and selectively controlling actuation of said at least one reversing valve for selective circulation of chilled and heated water through said chilled and heated water coils.

20. The thermal zone demand controlled air conditioning system of claim 1, wherein said air circulation system comprises:
   a housing defining an air return chamber and a conditioned air chamber;
   said at least one coil being a first and second chilled water coils being arranged in series and collectively defining an air flow and conditioning partition between said air return chamber and said conditioned air chamber through which return air flows from said air return chamber to said conditioned air chamber through said chilled water coils and accomplishing heat transfer from chilled water circulating through said first and second chilled water coils;
   first and second chilled water circuits being connected respectively with said first and second chilled water coils and having first and second pumps each independently circulating chilled water through said first and second chilled water circuits and each having a reversing valve;
   a return air plenum receiving return air from said thermal zones;
   a return air blower being connected to said return air plenum and forcing return air from said return air plenum into said return air chamber and through said first and second heat exchange coils; and
   said plurality of thermal zone blowers being connected to said housing in communication with said conditioned air chamber and having respective electric motors being independently controlled as to operation by said electronic control circuitry and being arranged for independent supply of conditioned air from said conditioned air chamber through respective air supply conduits to respective thermal zones.

21. The thermal zone demand controlled air conditioning system of claim 1, wherein:
   said plurality of thermal zone blowers each having inlet guide vanes being controlled by direct digital control signals.

22. The thermal zone demand controlled air conditioning system of claim 1, wherein:

said plurality of thermal zone blowers each having inlet guide vanes being controlled by pneumatic control signals.

23. The thermal zone demand controlled air conditioning system of claim 1, wherein:

said plurality of thermostats each having a mode selector switch having a "cool" position for air conditioning by said sources of heating and cooling and a "heat" position for heating by said sources of heating and cooling and an "off" position for deenergizing said sources of heating and cooling; and a "cool" selector circuit and a "heat" selector circuit being provided in each of said plurality of thermostats, said "cool" and "heat" selector circuits each having circuit contacts being selectively closed by said mode selector switch;

said first and second sources of heating and cooling being first and second heat pumps each having an electric resistance heat strip element, energization of said "cool" selector circuit designating first and second stages of cooling by selective operation of said first and second heat pumps and energization of said "heat" selector circuit designating first, second and third stages of heating via said first and second heat pumps and said electric resistance heat strip elements of said first and second heat pumps.

24. The thermal zone demand controlled air conditioning system of claim 1, wherein:

said plurality of thermostats each having a mode selector switch having a "cool" position for air conditioning by said sources of heating and cooling and a "heat" position for heating by said sources of heating and cooling and an "off" position for deenergizing said sources of heating and cooling; and a "cool" selector circuit and a "heat" selector circuit being provided in each of said plurality of thermostats, said "cool" and "heat" selector circuits each having circuit contacts being selectively closed by said mode selector switch;

said plurality of sources of heating and cooling comprise water chillers, water heaters, a plurality of water control valves and having a plurality of water coils being located in series within said conditioned air chamber;

said electronic controller circuitry selectively positioning said plurality of water control valves to control the volume of water flow through said water coils and thus properly regulate the temperature to the water being circulated through said plurality of water coils within said conditioned air chamber; and energization of said "cool" selector circuit designating first and second stages of cooling by selective operation of said water chillers and energization of said "heat" selector circuit designating first and second and third stages of heating by selective operation of said water chillers and said water heater.

25. The thermal zone demand controlled air conditioning system of claim 5, comprising:

thermostats being located within respective thermal zones of said building space and each having a mode selector switch having "heat", "cool" and "off" modes;

said plurality of chilled water systems each having a water pump motor and each being located external to the building space and each pump motor having a power supply and a power control relay for selectively connecting said power supply with the pump motor thereof and operating the selected pump motor;

a plurality of operational relays for said sources of heating and cooling each having activation coils and having equipment power control conductors connected to said power control relays of respective equipment for operation thereof and further having relay switched contacts for said power control conductors; and said activation coils of said operational relays of said sources of heating and cooling being selectively energized responsive to temperature control signals of either of said plurality of thermostats and selective positioning of said mode selector switches of said thermostats.

26. The thermal zone demand controlled air conditioning system of claim 25, wherein said electronic controller circuitry further comprises:

a plurality of control relays each having an operational coil connected for selective energization by said dc power supply and having power circuits being connected with said ac power supply and power control connections being selectively energized by said ac power supply for control power supply to respective sources of heating and cooling upon dc current energization of the operational coil thereof; and a reversing relay having first and second dc power supply circuits being selectively energized by completion of said "cool" selector circuit and said "heat" selector circuit, said first dc power supply circuit being connected to the coil of the power control relay for a first source of heating and cooling and said second dc power supply circuit being connected to the coil of the power control relay for a second source of heating and cooling for selection of either of said first and second sources of heating and cooling as the primary or secondary source of heating and cooling responsive to selective completion of said "cool" and "heat" selector modes of said thermostats.

27. The thermal zone demand controlled air conditioning system of claim 1, further comprising:

a plurality of thermostats being located within respective thermal zones, each of said thermostats comprising:

a thermostat power supply conductor being connected with said controller power supply;

a temperature sensor having an electric power base connected to said thermostat power supply conductor and having electronic logic reflecting blower speed and having blower speed electrical connections responsive to the sensing of predetermined low and high temperatures; and a microprocessor having low temperature and a high temperature settings selectively energize said controller power supply responsive to temperature in the respective thermal zone sensed by said temperature sensor of said thermostat for selectively controlling energization of said blower speed of said thermal zone blower by said controller power supply.

28. A thermal zone demand controlled air conditioning system for building spaces having a plurality of thermal zones therein, comprising:

a plurality of sources of heating and cooling being located externally of the building space;

an electronic environmental control system having a microprocessor with firmware controlling relays and settings for blower motor operation at "cool", "heat" and "off" modes of operation;

a plurality of thermostats each being located within a respective one of said plurality of thermal zones and sensing the temperature of conditioned air therein, said plurality of thermostats each having firmware associated with the electronic environmental control system making the relays and settings at the thermostats congruent such that the set thermal zone temperature is maintained based on thermostat mode selection and set point;

a conditioned air supply and return assembly having a conditioned air chamber, an air return plenum and a plurality of air supply conduits conducting conditioned air from said conditioned air chamber to respective thermal zones;

a plurality of thermal zone air supply blowers with motors each being situate for moving conditioned air from said conditioned air chamber through respective air supply conduits to respective thermal zones;

an internal heat exchange coil for each of said plurality of sources of heating and cooling being in series with within said conditioned air chamber upstream of said air supply conduits and blowers; and an air return blower being located within said conditioned air chamber and forcing air from said air return plenum into said conditioned air chamber through said internal coils.

29. The thermal zone demand controlled air conditioning system and environmental control system of claim 28, wherein:

said plurality of sources of heating and cooling heat pumps;

electronic heat pump and blower control circuitry being selectively conditioned to select one of said heat pumps as the primary heat pump for operation to accommodate a predetermined thermal load and to select the other of said heat pumps as the secondary heat pump for operation simultaneously with said primary heat pump to accommodate thermal load in excess of said predetermined thermal load, said electronic heat pump and blower control circuitry also being selectively conditioned for reversing said primary and secondary selection of said pair of heat pumps; and said electronic heat pump and blower control circuitry further having a plurality of zone control circuits each being electronically coupled with one of said plurality of thermostats for thermal zone and thermal load controlled zone blower and heat pump control signals.

30. The thermal zone demand controlled air conditioning system and system controller of claim 28, wherein said plurality of thermostats each comprise:

a mode selection through the configuration settings can be set in a "cool" state for air conditioning by said sources of heating and cooling, and a "heat" mode for heating by said sources of heating and cooling, a "fan only" position which will allow fans to run and overrides and prevents the sources of heating and cooling from operating and an "off" position deenergizing said sources of heating and cooling.

31. The thermal zone demand controlled air conditioning system and electronic system controller of claim 28, wherein:

said plurality of sources of heating and cooling being heat pumps, firmware logic in said microprocessor selectively alternating selection of which heat pump is electronically designated primary and secondary to achieve balance of the run time of said heat pumps.

32. The thermal zone demand controlled air conditioning system and electronic system controller of claim 29, comprising:

said plurality of heat pumps each having a compressor motor;

said plurality of heat pumps each having an ac operating power supply and having a dc circuit having a microprocessor and with logic in the firmware of said microprocessor for selectively energizing said compressor motors of said plurality of heat pumps thereof;

said microprocessor sequencing the operation of said compressor motors and said blower motors through relays and electronic switches; and said microprocessor monitoring the measured temperature signals of said plurality of thermostats and modifying the operating characteristics of said plurality of heat pumps responsive to said measured temperature signals.

33. The thermal zone demand controlled air condition system and electronic system controller of claim 28, wherein said control circuitry and microprocessor logic further comprises:

a plurality of control relays each having an operational coil connected for selective energization by said dc power supply and having power circuits being connected with said ac power supply and power control connections being selectively energized by said ac power supply for control power supply to respective equipment upon dc current energization of the operational coil thereof; and when said plurality of sources of heating and cooling are heat pumps, a reversing relay having first and second dc power supply circuits being selectively energized by completion of said "cool" selector circuit and said "heat" selector circuit, said first dc power supply circuit being connected to the coil of the power control relay for a first heat pump and said second dc power supply circuit being connected to the coil of the power control relay for a second heat pump for selection of either of said first and second heat pumps as the primary or secondary heat pump responsive to selective completion of said "cool" and "heat" selector circuits.

34. The thermal zone demand controlled air conditioning system of claim 27, wherein said plurality of thermostats comprise:

a solid state thermostat device having a thermostat microprocessor managing the input data from the temperature sensor;

based on the temperature sensed said thermostat microprocessor energizing the blower motors at low speed when the measured temperature is one degree away from the set point temperature and energizes a first of said heat pumps;

based on the temperature sensed said thermostat microprocessor energizing the blower motors at a higher speed when the measured temperature is two degrees away from the set point, the microprocessor energize energizing the blower motor at a higher speed as needed to condition the air within said conditioned chamber for the heating or cooling that is needed; and a low temperature electrical relay and a high temperature electrical relay being selectively energized by said controller power supply responsive to temperature in the respective thermal zone sensed by said temperature sensor of said thermostat for selectively controlling energization of said low speed and high speed coils of said thermal zone blower by said controller power supply.

35. The thermal zone demand controlled air conditioning system of claim 28, wherein said plurality of thermostats each comprise:

a controller power supply;

a temperature sensor having an electric power base and having electrical connections to the microprocessor of said electronic system controller with functionality to monitor input temperatures and then output actions to the respective blower motor and to said plurality of sources of heating and cooling;

a power supply conductor having connection with said electric power base and providing electric power supply thereto from said electronic system controller; and separate sets of electrical relays being selectively energized by said electronic system controller for selectively controlling energization of said blower motor speeds of said thermal zone blower by said electronic system controller for the thermal zone in which said thermostat is located.

36. A thermal zone demand controlled air conditioning system for heating and cooling the air of a building space having a plurality of thermal zones, comprising:

an air circulation system circulating thermally treated air to and return air from said thermal zones and having a conditioned air chamber and a plurality of conditioned air supply conduits each being disposed in air supplying relation with a respective one of said thermal zones of said building space;

a multi-stage thermal source being located externally of said building space;

a heat exchanger located within said air circulation system and having thermal transferring relation with said thermal source;

a plurality of thermal zone blowers and air supply conduits being connected in said air circulation system and conducting conditioned air from said conditioned air chamber through respective conditioned air supply conduits to respective thermal zones of said building space; and electronic controller circuitry being coupled in staged operational control of said thermal source and thermal demand operation of said plurality of thermal zone blowers controlling said thermal source and said plurality of thermal zone blowers for electronically selected operation of said thermal source and said plurality of thermal zone blowers responsive to the thermal demands of the respective thermal zones of the building space.

37. The thermal zone demand controlled air conditioning system of claim 36, comprising:

said multi-stage thermal source being a water circuit;

at least one pump being connected in said water circuit and causing water flow in said water circuit;

a water chiller being in connection with said water circuit and chilling water flowing therethrough;

a water heater being in connection with said water circuit and selectively adding heat to water flowing therethrough; and said heat exchanger being a single circuit heat exchanger coil in connection with said water circuit.

* * * * *

UNITED STATES PATENT AND TRADEMARK OFFICE
CERTIFICATE OF CORRECTION

PATENT NO. : 6,792,766 B2
DATED : September 21, 2004
INVENTOR(S) : David Osborne, Brian Chester and Gary R. Scoggins It is certified that error appears in the above-identified patent and that said Letters Patent is hereby corrected as shown below:

Column 1,
Line 24, delete "beating", and insert -- heating --

Column 32,
Line 62, delete "energize"

Signed and Sealed this

Fifteenth Day of March, 2005

JON W. DUDAS
*Director of the United States Patent and Trademark Office*